(12) United States Patent
Mord et al.

(10) Patent No.: US 11,546,138 B2
(45) Date of Patent: Jan. 3, 2023

(54) INFORMATION INTEGRITY IN BLOCKCHAIN AND RELATED TECHNOLOGIES

(71) Applicants: Benjamin Allan Mord, Scarsdale, NY (US); Allan J. Mord, Boonton, NJ (US)

(72) Inventors: Benjamin Allan Mord, Scarsdale, NY (US); Allan J. Mord, Boonton, NJ (US)

(*) Notice: Subject to any disclaimer, the term of this patent is extended or adjusted under 35 U.S.C. 154(b) by 297 days.

(21) Appl. No.: 16/581,946

(22) Filed: Sep. 25, 2019

(65) Prior Publication Data

US 2020/0106605 A1 Apr. 2, 2020

Related U.S. Application Data

(60) Provisional application No. 62/738,325, filed on Sep. 28, 2018.

(51) Int. Cl.
*H04L 9/08* (2006.01)
*H04L 9/10* (2006.01)
(Continued)

(52) U.S. Cl.
CPC ............ *H04L 9/0825* (2013.01); *H04L 9/085* (2013.01); *H04L 9/0869* (2013.01); *H04L 9/10* (2013.01); *H04L 9/14* (2013.01); *H04L 9/3236* (2013.01)

(58) Field of Classification Search
CPC . H04L 2209/38; H04L 9/0662; H04L 9/0825; H04L 9/085; H04L 9/0869;
(Continued)

(56) References Cited

U.S. PATENT DOCUMENTS 4,860,352 A * 8/1989 Laurance ............... G01S 19/00
455/12.1
5,757,916 A * 5/1998 MacDoran ............ G01S 19/215
380/258
(Continued)

FOREIGN PATENT DOCUMENTS

GB 2395304 A * 5/2004 ............. G06F 12/14
WO WO2017/100864 6/2017

OTHER PUBLICATIONS

Search Query Report from IP.com (performed Dec. 3, 2021) (Year: 2021).*

(Continued)

*Primary Examiner* — Sharon S Lynch
(74) *Attorney, Agent, or Firm* — Fish & Richardson P.C.

(57) ABSTRACT

Described are techniques for securing a most recent block in a data structure such as a blockchain. Techniques include configuring a data processing node that is deployable to a physical location, with a module that generates a verification signing key (VSK) pair, the VSK pair including a private VSK key that is known only to the data processing node, and a public VSK key, receiving by the data processing node, an indication of the deployment to the physical location, generating in response to the indication, by the data processing node the verification signing key (VSK) pair, and transmitting from the data processing node the public VSK key to one or more electronic devices. These techniques assure to a high degree that the generated private key remains unknown and thus can be used to secure the most recent block that is added to a data structure such as a blockchain.

27 Claims, 12 Drawing Sheets

(51) Int. Cl.
   *H04L 9/14* (2006.01)
   *H04L 9/32* (2006.01)
(58) Field of Classification Search
   CPC . H04L 9/10; H04L 9/14; H04L 9/3236; H04L 9/3239; H04L 9/3247; H04L 9/3297
   See application file for complete search history.

(56) References Cited

U.S. PATENT DOCUMENTS

| | | | | |
|---|---|---|---|---|
| 6,157,621 | A * | 12/2000 | Brown | H01Q 1/242 370/310 |
| 6,166,688 | A * | 12/2000 | Cromer | H04W 12/082 701/469 |
| 6,766,987 | B2 * | 7/2004 | Taormina | H04B 7/195 244/158.4 |
| 7,143,287 | B2 * | 11/2006 | Bade | G06F 21/57 713/164 |
| 7,151,929 | B1 | 12/2006 | Jenkin et al. | |
| 7,385,942 | B2 | 6/2008 | Brady et al. | |
| 8,412,946 | B2 * | 4/2013 | Savitzky | G06F 21/725 713/178 |
| 8,904,181 | B1 * | 12/2014 | Felsher | H04L 63/0442 713/171 |
| 8,948,392 | B2 * | 2/2015 | Chassagne | G01S 19/09 713/172 |
| 8,954,740 | B1 * | 2/2015 | Moscaritolo | H04L 9/14 713/171 |
| 9,516,002 | B2 * | 12/2016 | O'Hare | H04L 12/4641 |
| 10,567,393 | B2 * | 2/2020 | Metzger | H04L 9/50 |
| 11,240,254 | B2 * | 2/2022 | Metzger | H04L 9/3239 |
| 2002/0051540 | A1 * | 5/2002 | Glick | H04L 63/10 713/168 |
| 2003/0001048 | A1 * | 1/2003 | Taormina | H04B 7/195 244/158.4 |
| 2003/0093187 | A1 * | 5/2003 | Walker | B64D 45/0034 701/1 |
| 2004/0010711 | A1 * | 1/2004 | Tang | G06Q 20/3823 726/27 |
| 2005/0147250 | A1 * | 7/2005 | Tang | G06Q 20/02 380/259 |
| 2006/0080536 | A1 * | 4/2006 | Teppler | H04L 9/3218 713/176 |
| 2006/0090070 | A1 * | 4/2006 | Bade | G06F 21/57 713/164 |
| 2007/0192586 | A1 * | 8/2007 | McNeely | H04N 21/2347 713/153 |
| 2010/0031024 | A1 * | 2/2010 | Hayes | H04L 9/321 713/156 |
| 2010/0096491 | A1 * | 4/2010 | Whitelaw | B64G 1/00 244/15 |
| 2012/0017093 | A1 * | 1/2012 | Savitzky | H04L 9/3236 713/178 |
| 2012/0205990 | A1 * | 8/2012 | Minnoy | H02J 13/00004 307/116 |
| 2013/0101121 | A1 * | 4/2013 | Nordholt | H04L 9/3226 380/279 |
| 2013/0251150 | A1 * | 9/2013 | Chassagne | H04L 63/123 380/270 |
| 2013/0275755 | A1 * | 10/2013 | Ignatchenko | H04L 63/0428 713/168 |
| 2013/0290704 | A1 * | 10/2013 | Giniger | H04L 63/0823 713/156 |
| 2014/0304503 | A1 * | 10/2014 | O'Hare | H04L 63/0823 713/157 |
| 2015/0256247 | A1 * | 9/2015 | Haley | H04B 7/18563 455/12.1 |
| 2015/0332283 | A1 | 11/2015 | Witchey | |
| 2016/0232400 | A1 * | 8/2016 | Herz | H04W 68/00 |
| 2016/0283920 | A1 * | 9/2016 | Fisher | H04L 9/3297 |
| 2016/0301531 | A1 | 10/2016 | Finlow-Bates | |
| 2017/0177898 | A1 | 6/2017 | Dillenberger | |
| 2017/0359288 | A1 | 12/2017 | Golan | |
| 2018/0136633 | A1 | 5/2018 | Small et al. | |
| 2018/0198630 | A1 | 7/2018 | Androulaki et al. | |
| 2018/0227042 | A1 * | 8/2018 | Haley | H04B 7/185 |
| 2018/0276249 | A1 * | 9/2018 | Herz | H04W 4/021 |
| 2019/0141524 | A1 * | 5/2019 | Wang | H04L 9/30 |
| 2019/0289018 | A1 * | 9/2019 | Metzger | H04L 9/50 |
| 2020/0028576 | A1 * | 1/2020 | Haley | H04B 7/212 |
| 2020/0228988 | A1 * | 7/2020 | Yang | H04L 9/0869 |
| 2020/0296114 | A1 * | 9/2020 | Metzger | H04L 9/50 |
| 2021/0091934 | A1 * | 3/2021 | Fletcher | H04L 9/3255 |

OTHER PUBLICATIONS

Search Query Report from IP.com (performed May 27, 2022) (Year: 2022).*
Yan Michalevsky and Yonatan Winetraub, SpaceTEE: Secure and Tamper-Proof Computing in Space using CubeSats (2017), available at https://arxiv.org/pdf/1710.01430.pdf. (Year: 2017).*
Search Query Report from IP.com (performed Sep. 21, 2022) (Year: 2022).*
International Search Report and Written Opinion, PCT/US2019/053078, dated Dec. 4, 2019, p. 1-12.
Mandi, "Bitcoin, Blockchains and Efficient Distributed Spacecraft Mission Control," Sep. 13, 2017, http://blog.etherreum.org/2015/08/07/on-public-and-private-blockchains/ p. 1-36.
Balasubramanian et al., "Secure key management for NASA space communication," ICNS Conference, Jan. 2005, p. 1-8.
CCSDS: "Space Missions Key Management Concept," In: Tech rep., The Consultative Committee for Space Data Systems, Nov. 2011, p. 1-56.

* cited by examiner

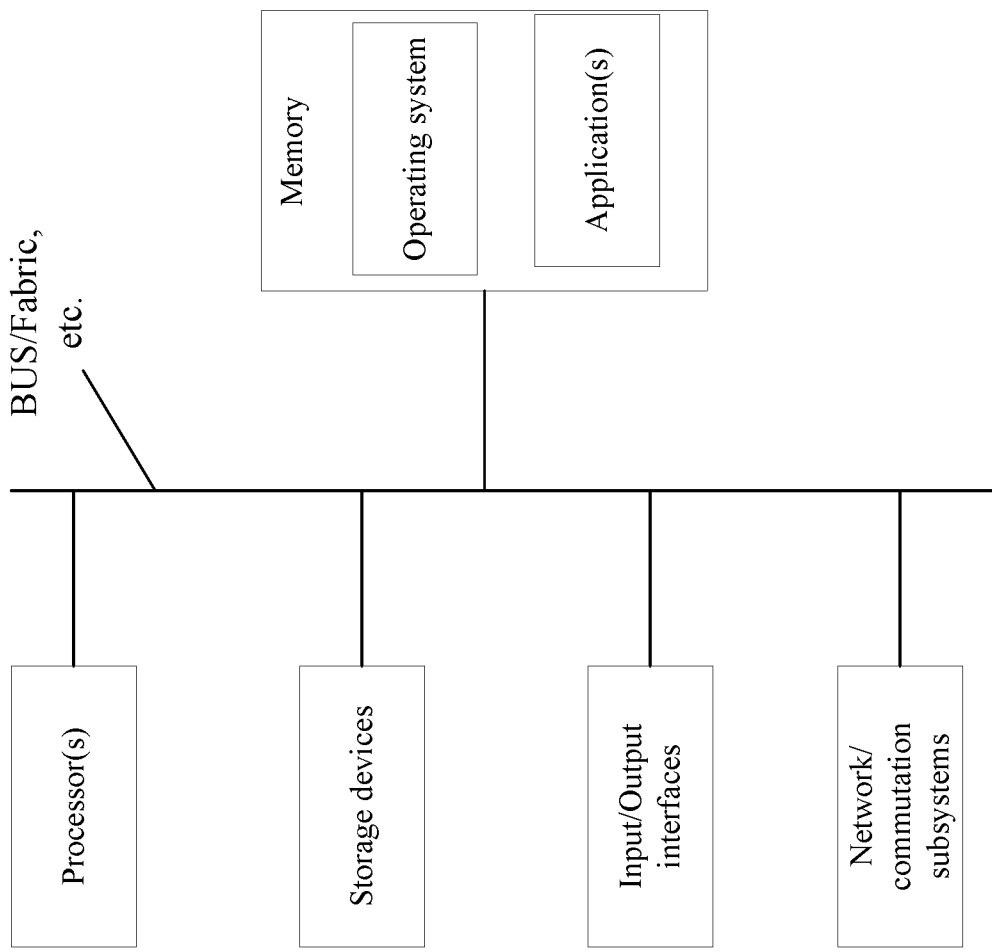

INFORMATION INTEGRITY IN BLOCKCHAIN AND RELATED TECHNOLOGIES

CLAIM OF PRIORITY

This application claims priority under 35 USC § 119(e) to U.S. Provisional Patent Application Ser. No. 62/738,325, filed on Sep. 28, 2018, and entitled "USE OF SPACECRAFT OR OTHER PHYSICALLY INACCESSIBLE PLATFORM AS HIGH-INTEGRITY FUNCTIONARIES FOR SECURING BLOCKCHAINS AND OTHER INFORMATION," the entire contents of which are hereby incorporated by reference.

BACKGROUND

This specification relates to information integrity in blockchains and other types of data structures.

Information security generally refers to practices used to prevent unauthorized access, use, disclosure, disruption, modification, inspection, recording, or destruction of information. Information security is widely understood to include (at least) three categories, e.g., confidentiality, availability, and integrity.

Confidentiality pertains to insuring that information that is confidential remains confidential. Confidentiality of digital information is typically provided by certain measures such as data encryption. Availability pertains to insuring that data and services can be accessed when needed.

Integrity generally refers to making sure that information is correct and not corrupted. For example, one common information integrity measure is a digital signature that is used to verify that received data actually came from the party from which the data claims to have originated. Another example of information integrity is immutability, involving mechanisms to make information tamper-resistant such that data cannot be surreptitiously altered after the data is recorded.

Blockchain (or block chain) is a technology that is potentially resistant to data modification. Blockchain potentially offers a capability of sharing business records whose tamper resistance (both content and order) can be trusted with greater confidence, for longer durations, and/or over a wider range of contexts, than any trust relationships that may exist among participants.

A blockchain includes data blocks that are linked together via a cryptographic hash function, where each block includes a hash of the prior block. The blockchain structure helps to make tampering evident because manipulating any part of the blockchain will alter the hash of the manipulated block(s) and every subsequent block in the chain. As such, if some data integrity mechanism is applied on a given block, then that integrity accrues to all prior blocks as well, and also to their block ordering in the blockchain.

One problem with chaining blocks together with cryptographic hash sums, as it pertains to the problem of data integrity, is securing the most recent block. Techniques have been used to secure the most recent block.

One technique to secure the most recent block in blockchains is "Proof of Work," such as presently used in Bitcoin. A proof of work algorithm involves performance of significant amount of computational work for the right to produce a new block.

Another approach to secure the most recent block in public block chains is Proof of Stake, which involves a set of "validators" signing the most recent block while having a certain amount of cryptocurrency at stake to incentivize certain behaviors necessary to the algorithm.

SUMMARY

According to an aspect, a method includes configuring a data processing node that is deployable to a physical location, with a module that generates a verification signing key (VSK) pair, the VSK pair including a private VSK key that is known only to the data processing node, and a public VSK key, receiving by the data processing node, an indication of the deployment to the physical location, generating in response to the indication, by the data processing node the verification signing key (VSK) pair, and transmitting from the data processing node the public VSK key to one or more electronic devices.

According to an additional aspect, a method includes obtaining a data processing node that is deployable to a physically inaccessible location; and configuring, a data processing node that is deployable to a physically inaccessible location, with a module that causes the data processing node subsequently to receive a deployment indicator signal from an deployment indicator, to generate in response to the deployment indicator signal, a verification signing key (VSK) pair that includes a private VSK key known only to the data processing node and a public VSK key, and to transmit from the data processing node the public VSK key to one or more electronic devices.

According to an additional aspect, a vehicle that is deployable to a physically inaccessible location includes a data processing node that includes one or more processor devices, memory operatively coupled to the one or more processor devices, and storage media that stores a computer program comprising instructions to generate upon deployment of the apparatus towards the remote physical location, a verification signing key (VSK) pair that includes a private VSK key known only to the data processing node and a public VSK key, and to transmit from the data processing node the public VSK key to one or more electronic devices.

According to an additional aspect, a data processing node includes one or more processor devices, memory operatively coupled to the one or more processor devices, and storage media that stores a computer program that comprises instructions to cause the one or more processors to generate upon deployment of the apparatus to the remote physical location, a verification signing key (VSK) pair that includes a private VSK key known only to the data processing node and a public VSK key, and transmit from the data processing node the public VSK key to one or more electronic devices.

According to an additional aspect, a computer program product tangibly stored on a non-transitory computer readable medium for configuring a data processing node that is deployable to a physically inaccessible location to generate a verification signing key (VSK) pair, the computer program product includes instructions to cause a data processing node to configure a module that generates a verification signing key (VSK) pair, the VSK pair including a private VSK key known only to the data processing node and a public VSK key, to receive an indication of a deployment to the physically location, to generate by the module in response to the indication, the verification signing key (VSK) pair, and transmit the public VSK key to one or more electronic devices.

The following features are among the features that may be included in one or more of the above aspects.

The data processing node is deployable to a physical location, more specifically to a physically inaccessible or remote location. The data processing node signs information transmitted to/from the one or more terrestrial electronic devices using the private VSK. One or more terrestrial nodes are configured to use the public VSK to verify integrity of the signed information. The node receives from one or more secure, true random number generators, a random number, and generates the VSK pair using the received random number. Subsequent to receiving the indication, VSK integrity assurance is maintained by transmitting a post-deployment VSK-signed timestamp of VSK generation as a proof that premature key generation did not occur. Transmitting the public VSK to the one or more terrestrial electronic devices occurs at periodic intervals.

The data processing node is contained in a spacecraft and the physical location is a trajectory of the spacecraft in outer space. The spacecraft includes an indicator module, and further includes generating by the indicator module the indicator signal that is acted upon by the data processing node when the spacecraft is deployed at or being deployed to the physically inaccessible location. The indicator module sends the indicator signal to the data processing node when the spacecraft is at or in transit to the physically inaccessible location.

The aspects further include receiving by the data processing node, a post-launch configuration command that indicates that post-launch configuration phase is complete, triggering a one-time mechanism to permanently disable post-launch configuration commands and enable production mode operation, and sending a notification to indicate that setup commands have been permanently disabled.

The aspects further include configuring the data processing node for containment into a spacecraft, and configuring the data processing node to receive the deployment indicator signal upon deployment of the spacecraft. The aspects further include configuring the spacecraft to generate the deployment indicator signal, when the spacecraft is being deployed to the physically inaccessible location or when the spacecraft is at the physically inaccessible location or just prior to launch of the spacecraft to the physically inaccessible location.

The vehicle is a spacecraft and the data processing node is contained in the spacecraft, and the instructions to transmit the public key, transmits the public key to the one or more terrestrial electronic devices at one or more periodic intervals. The vehicle wherein the computer program further includes instructions to receive a post-launch configuration command that indicates that a post-launch configuration phase is complete, trigger a one-time mechanism to permanently disable post-launch setup configuration commands and enable production mode operation, and send a notification to indicate that setup configuration commands have been permanently disabled.

The data processing node further includes instructions to transmit to a receiver station a VSK-signed timestamp of VSK generation as a proof that premature key generation did not occurred for maintaining VSK integrity assurance. The data processing node further includes instructions to receive a post-deployment configuration command that indicates that post-deployment configuration phase is complete, trigger a one-time mechanism to permanently disable post-deployment setup configuration commands and to enable production mode operation, and send a notification to indicate that setup configuration commands have been permanently disabled.

One or more of the above aspects may provide one or more of the following advantages.

The disclosed mechanisms may advantageously leverage physical inaccessibility of, e.g., spacecraft and/or other remote platforms to provide information integrity guarantees beyond or even in the absence of ongoing trust relationships among participants and thus avoid much of or all of the need for Proof of Work in securing rights to produce new blocks for blockchains. The unique integrity benefits of physical inaccessibility and physical remoteness may be exported to others who may or may not be so located. Furthermore, information integrity guarantees may advantageously be achieved using blockchain or other suitable data structures that offer certain information integrity assurances (e.g., decentralization, trust agnosticism, immutability, tamper-resistance, etc.) without the economic, environmental, scalability, security, regulatory, functional, and other liabilities of Proof of Work and/or other conventional techniques.

The disclosed mechanisms avoid the waste of significant amounts of electricity to power computers that are used to solve Proof of Work algorithms that enable users to produce new blocks. These disclosed mechanisms avoid susceptibility to an attack known as the miner's 51% attack. These disclosed mechanisms avoid scaling problems, whether scaling down for small blockchains that cannot afford a large amount of waste or scaling up for blockchains that require extremely high assurance level requirements. The disclosed mechanisms facilitate mitigation of problems associated with use of cryptographic primitives such as cryptographic signatures and hash functions which might one day fall to either quantum or classical cryptanalysis. The disclosed mechanism are not limited to use with cryptocurrencies as is usually the practice with Proof of Work mechanisms, since an incentive mechanism is required to fund the chosen form of waste. In addition, the disclosed mechanisms also avoid vulnerability to price crashes, as can occur with cryptocurrencies.

The disclosed mechanisms also mitigate or avoid the problems of "Proof of Stake" algorithms pertaining long-term exposure of public signing keys, and vulnerability to quantum or classical cryptanalysis, as well as their restriction to contexts involving cryptocurrency, as well as their vulnerability to price crashes.

The disclosed mechanisms also avoid the problems of another common answer to simply trust certain known terrestrial entities (comprised of or physically accessible to humans and therefore corruptible) to sign the most recent block, thus effectively turning these known entities into trusted custodians of data integrity. If the level of that trust is as high as the required assurance of tamper resistance, this approach works, but would tend to vitiate the need to use a blockchain, since the purpose of blockchains is to provide tamper resistance whose assurance exceeds available trust relationships.

The details of one or more embodiments of the invention are set forth in the accompanying drawings and the description below. Other features, objects, and advantages of the invention are apparent from the description and drawings, and from the claims.

DESCRIPTION OF THE DRAWINGS

FIG. 7 illustrates an exemplary device that can be configured in accordance with the various aspects and embodiments described herein.

DETAILED DESCRIPTION

Figure 1:
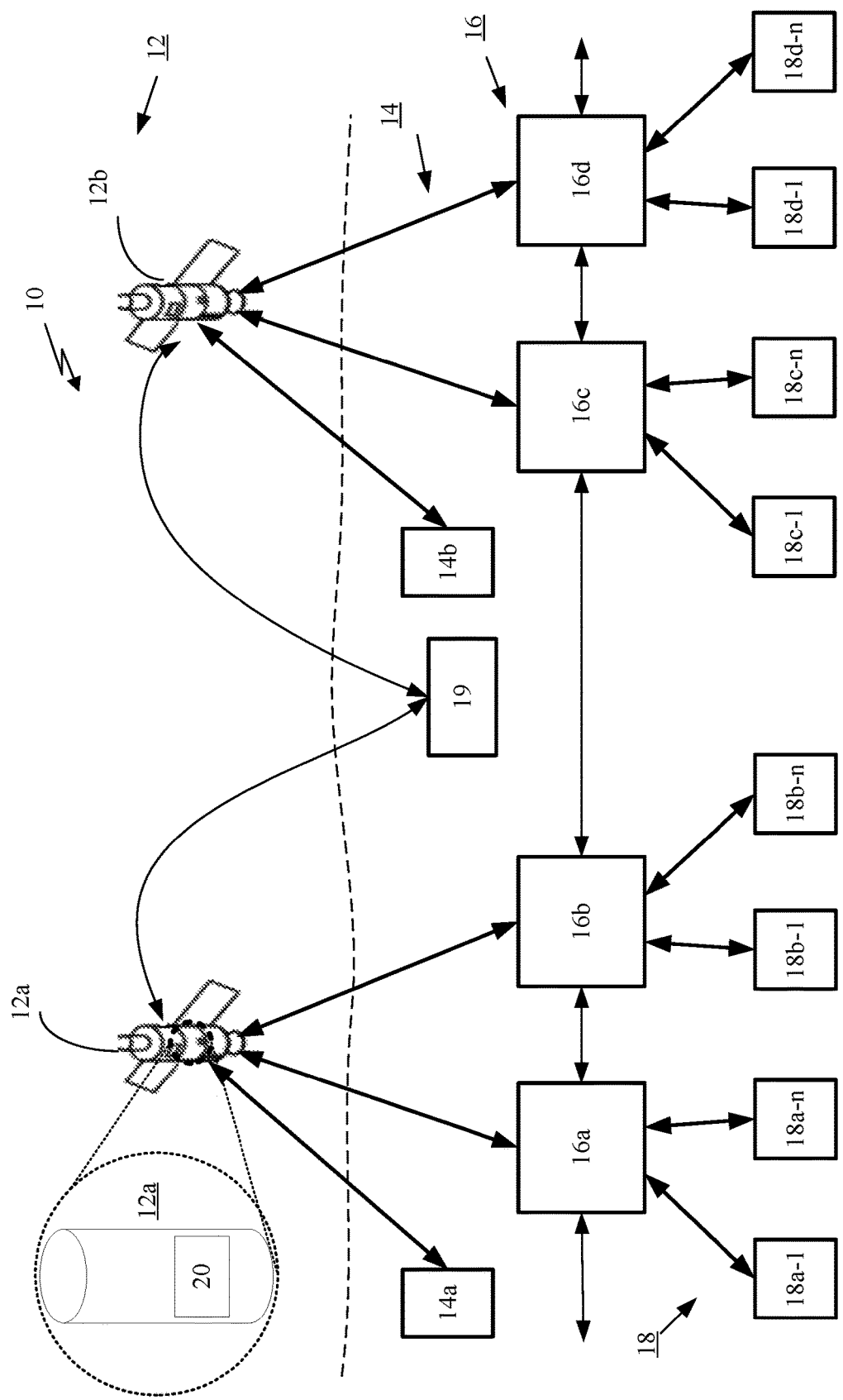
FIG. 1 is a block diagram of an exemplary system.

The present disclosure describes data processing platforms located in physically inaccessible, physically remote, high velocity, inhospitable, or other such environments that function as high integrity entities for securing blockchains and other information in a manner that can replace the need for Proof of Work and/or other similar techniques for securing the tamper resistance of data. Physical remoteness or physical inaccessibility of a processing node (e.g., spacecraft, satellites, deep underwater processing nodes, etc.) provide security advantages, including that the processing node is difficult to physically access and/or manipulate (e.g., by physical contact or electromagnetic reception of emissions) that makes it more difficult to compromise the integrity of the processing node (e.g., to alter what the node does from a computational perspective, alter the data contained within the node, or retrieve private keys). Additionally, such remote or inaccessible processing nodes may mitigate security risks associated with proximity-based attacks, including those that may remotely analyze electromagnetic radiation that an electronic device emits to recover cryptographic signing keys stored on the device, etc.

The cryptography and cryptographic-like techniques described herein along with provision of remote or inaccessible processing nodes provide unique integrity advantages to an assurance level exceeding that of ongoing trust relationships among participants and/or their employees.

One example that the described techniques can be applied to is a blockchain technology, as used in Bitcoin. A blockchain potentially allows a group of entities (systems) to accumulate shared data records whose tamper-resistance can be trusted even beyond any trust that the entities may have in each other. Thus, rather than centralizing trust in just a few administrators who may or may not remain trustworthy, blockchain technologies potentially provide reason to believe in the tamper-resistance of the chained data records without regard to any trust (or lack thereof) in the participating entities.

Bitcoin involves a Proof of Work blockchain network generally includes one or more miner devices (referred to herein simply as "miners") and one or more client devices that are interconnected through a communication network, such as the Internet. The miners each maintain a publicly distributed ledger, whose tamper resistance is secured using a blockchain, and in which certain transactions or other suitable data records are recorded.

When a client device broadcasts a transaction message through the network, a miner may independently verify the validity of the transaction based on a local copy of the current blockchain. One of the miners produces a valid new block incorporating a group of newly accepted transactions at regular intervals and broadcasts the new block through the network to the other miners. The other miners each independently verify the new block and append the new block to their local copies of the blockchain.

Therefore, the miners may provide a record-keeping service by verifying newly broadcast transaction messages and collecting a group of valid new transactions into a new block of the blockchain. A new block contains a cryptographic hash of the previous block, thus "chaining" the new block to the previous block.

In a Proof of Work blockchain network, a new block must also contain a "proof-of-work" to be considered valid, wherein the proof-of-work may consist of a difficulty target and a nonce. To produce a valid new block, a miner finds a nonce that yields a hash of the new block that is numerically smaller than a number indicated by the difficulty target. Due to the nature of the cryptographic hash function, the validity of a new block containing a particular nonce is computationally easy to verify but computationally hard to produce. The miner is therefore compensated for this great effort with cryptocurrency in a "block reward," which results in monetary inflation and may therefore be viewed as a value tax distributed across all holders of the cryptocurrency. In Bitcoin and similar blockchain protocols, the difficulty target is updated every N blocks based on the total computational capability across the whole blockchain network, such that a new valid block is always found in approximately the same amount of time (e.g., every ten minutes).

The "chaining" of the blocks and the proof-of-work system make falsifying the blockchain extremely difficult, as falsification of a single block requires modification of all subsequent blocks to maintain the validity of the whole blockchain, which is difficult to achieve for an attacker with limited computational resources as compared to the combined computational power of all the other miners. As new blocks are created and incorporated into the blockchain, the difficulty to falsify a particular past block increases as time passes. A particular transaction is deemed to have been confirmed across the blockchain network when the block containing the transaction has been followed by a sufficient number of subsequent blocks in the blockchain.

Although blockchain technology advantageously offers distinct entities the ability to accumulate shared data records whose tamper-resistance can be trusted without regard to whether or not the entities trust each other, the Proof of Work and alternative mechanism(s) currently used to secure blockchains suffer from various limitations and drawbacks, as was discussed above.

In the description below, physical inaccessibility or physical remoteness of one or more data processing nodes and secure post-deployment generation of key pairs, are each independently and together providing certain information integrity guarantees to participants, for example (but not exclusively) through the use of blockchain data structures, even if there is no ongoing trust relationship among the participants, but without the economic, environmental, scalability, security, regulatory, functional, and other liabilities of Proof of Work and other conventional techniques.

Furthermore, although the description provided herein is in context with blockchain data structures, those skilled in the art will appreciate that the present disclosure is not limited to blockchain data structures and the approaches described herein may alternatively and/or additionally be implemented using other suitable data structures.

In the following description, references are made to various different signing keys, which are generally public/private key pairs (e.g., in the sense of ECDSA or RSA signature key pairs), where the private key of a given key pair is used for signing and is kept secret by the signing entity, while other entities use the public key of the given key pair to verify signatures made with the private key.

Referring now to FIG. 1, an exemplary system 10 that uses spacecraft, e.g., satellites, as a physically inaccessible platform to secure blockchains and other information is shown. The system includes one or more physically inaccessible platforms, e.g., satellites 12. Each of the satellites 12 includes a data processing node 20. Satellites 12 are an example of a physically inaccessible platform. Other examples of physically inaccessible platforms include platforms at the bottom of a body of water (e.g., deep underwater nodes) or that are physically inaccessible and physically remote from potentially malicious parties.

The system 10 includes one or more satellites 12a, 12b, etc. that are either identical in design or that may be different in design. However, although the satellites 12a, 12b, etc. may potentially have different designs, each satellite (generally 12) is manufactured to satisfy certain design constraints. Each of the one or more satellites 12a, 12b may have a respective owner that communicates with the one or more satellites 12a, 12b, etc. via corresponding owner systems 14a, 14b, etc. Each satellite 12 may include one secret random data string known only to the satellite 12 (i.e., the data processing node 20) and the corresponding owner system (generally 14) of the satellite 12.

The system 10 further includes one or more committer systems 16 per satellite 12. For example, committer systems 16a, 16b are associated with satellite 12a, and committer systems 16c, 16d are associated with satellite 12b, etc. The system 10 further includes one or more user systems (generally 18) typically multiple users systems per committer system. As shown, user systems 18a-1 to 18a-n are associated with committer system 16a, user systems 18b-1 to 18b-n are associated with committer system 16b, user systems 18c-1 to 18c-n are associated with committer system 16c, and user systems 18d-1 to 18d-n are associated with committer system 16d.

In addition, as will be described in further detail below, the system 10 may optionally include one or more independent observer systems 19 that may include services/applications for auditing the satellites 12 by auditors, regulators, competitors, security researchers, and/or other entities for public or private ongoing skeptical evaluation of the design and operation of the system 10.

Figure 2:
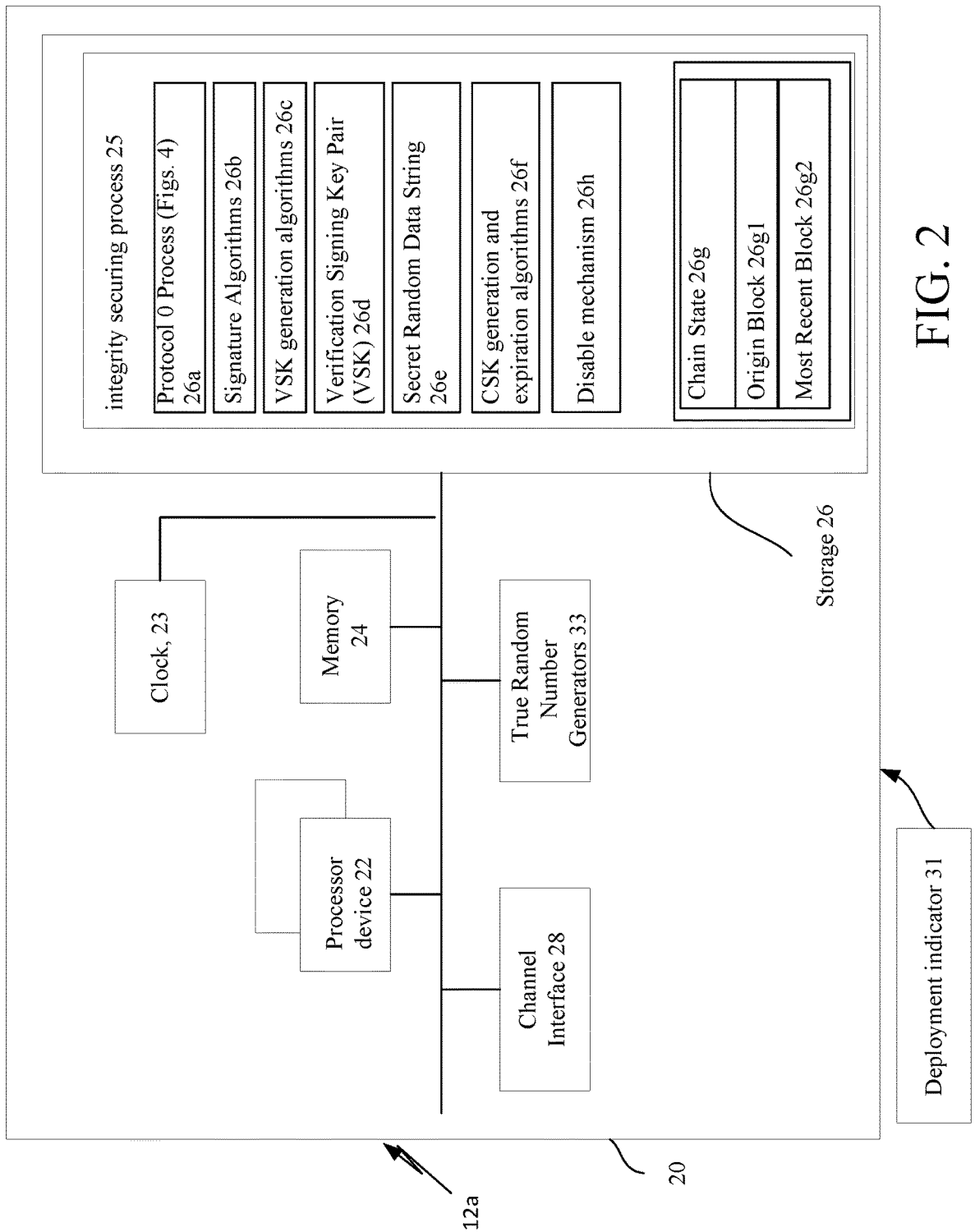
FIG. 2 is a block diagram that illustrates an exemplary data processing node that may be used with the system of FIG. 1.

Referring now to FIG. 2, the data processing node 20 for satellite 12a is shown as including one or more processor devices 22, memory 24 operatively coupled to the one or more processor devices 22, clock 23, storage 26, network interfaces 28 and one or more random number generators 33. (Other conventional details may be included but are not shown.) The data processing node 20 for satellite 12a is typical for all of the data processing nodes 20 for the satellites 12b, etc.

The storage device 26 stores an integrity securing process 25 for information. The securing process 25 includes a protocol process 26a (such as shown in FIGS. 4B, 4C, and 4D), signature algorithms 26b, VSK key generation algorithms 26c, a verification signing key pair (VSK) 26d known only to processing node 20 in the satellite, a secret random data string 26e known only to the owner 14 and the node 20 in the satellite 12, CSK generation and expiration algorithms 26f, chain state 26g for each blockchain 50 including the origin block 26g1 and most recent block 26g2 for each blockchain, and optionally an owner system associated with the particular satellite. While full blockchains could be stored on satellites, they need not be as only 26g1 and 26g2 need be stored, (for improved service life) as shown in FIG. 2.

The protocol process 26a may be as described in conjunction with FIGS. 4A-4D. The signature algorithms 26b use the VSK 26d in signature generation. Examples may include RSA, ECDSA, lattice-based, or other suitable signatures and/or hash-based signature schemes such as the Timed Efficient Stream Loss-tolerant Authentication (TESLA) broadcast authentication protocol in place of or in a secure redundant combination with conventional signature functionality for enhanced long-term protection against future quantum or classical cryptanalytic advances.

The secret random data string 26e may be chosen to have sufficient entropy, for example, by requiring that the number of bits of entropy in the secret random data string exceed a minimum threshold value, where the minimum threshold value may be determined according to one or more of signature algorithm selection, tolerance of the respective satellite owner for risk of premature obsolescence, anticipated sophistication of potential attackers, and/or other such routine considerations, as would be apparent to those skilled in the cryptography arts. The secret random data string 26e is used for deriving an arbitrary number of commit signing keys (CSKs) per satellite 12, according to CSK generation and expiration algorithms 26f. Because the secret random data string 26e as well as the CSK generation and expiration algorithms 26f are also known to the respective satellite owner, the CSKs may also be derived by, and thus are effectively known by, the satellite owner, who may then sell these expirable CSKs to committers 16.

The data processing node 20 of the satellite 12a includes one or more secure true random number generators (TRNG) 33 for one-time use in a VSK generating module 26c for producing a satellite-specific verification signing key pair (VSK) 26d. A VSK pair is a combination of a public key and a private key. The public key of a VSK pair is disseminated widely, to user systems for validating signatures, while the private key of the VSK pair is held secret known only to the data processing node 20 in the satellite 12a for the purpose of creating signatures. The data processing node 20 includes the module 26c for generation of such VSK keys 26d.

Security requires keeping the private key private, while the public key can be distributed without compromising security. That is, in the context of the system 10, the VSK private key is only known to the data processing node 20 on the satellite 12 (i.e., the private VSK may be unknown even to the owner system 14 of the corresponding satellite 12, as well as other satellites). The public key is known to all interested participant systems in the system 10.

The data processing node 20 may include or be coupled to a deployment indicator 31. The deployment indicator 31 provides a signal to the data processing node 20 that indicates the satellite 12a has been deployed at or is on its way to the physically inaccessible location. The indicator would typically be an indication that the satellite was deployed at the physically inaccessible location. The deployment indicator 31 signal is fed to the data processing node 20 and used by the module 26c that generates the verification signing key (VSK) pair 26d by the data processing node 20. Upon receipt of the indicator signal, the module 26c generates the verification signing key (VSK) pair 26d.

The deployment indicator 31 can be any device that generates the signal, under configured for circumstances. For example, the deployment indication 31 can be a time delay, a launch command signal sent to a rocket that deploys the satellite, an accelerometer, a light sensor, a radiation sensor, a thermometer, a magnetometer, a signal generated by an altimeter that signals when the satellite reaches its deployed altitude. Other examples include a GPS receiver, a proximity sensor such as radar, a camera, a signal received from ground, any combination of these or other techniques, including perhaps a pull tab removed by ground personnel preparing the satellite for launch.

If the mechanism(s) employed is subject to malicious or accidental premature triggering, thus risking exposure of compromising low-power electromagnetic emissions during VSK generation or such vulnerabilities, VSK integrity assurance could nevertheless be maintained by having the satellite transmit post-launch the optionally VSK-signed timestamp of VSK generation so as to prove that premature key generation did not occurred. Optionally, a ground-based command could be supported to trigger VSK recreation in the event that this did occur. Those skilled in the art will recognize a variety of alternative approaches to assuring that final VSKs are produced post-launch.

The applicable data integrity design constraints may optionally further require each satellite 12 to have a one-time use mechanism 26h that permanently disables setup commands. For example, the satellites 12 and/or the data processing node 20 may include an on-board fuse that permanently disables setup commands once blown, although other suitable one-time use mechanisms may be implemented instead.

Figure 3:
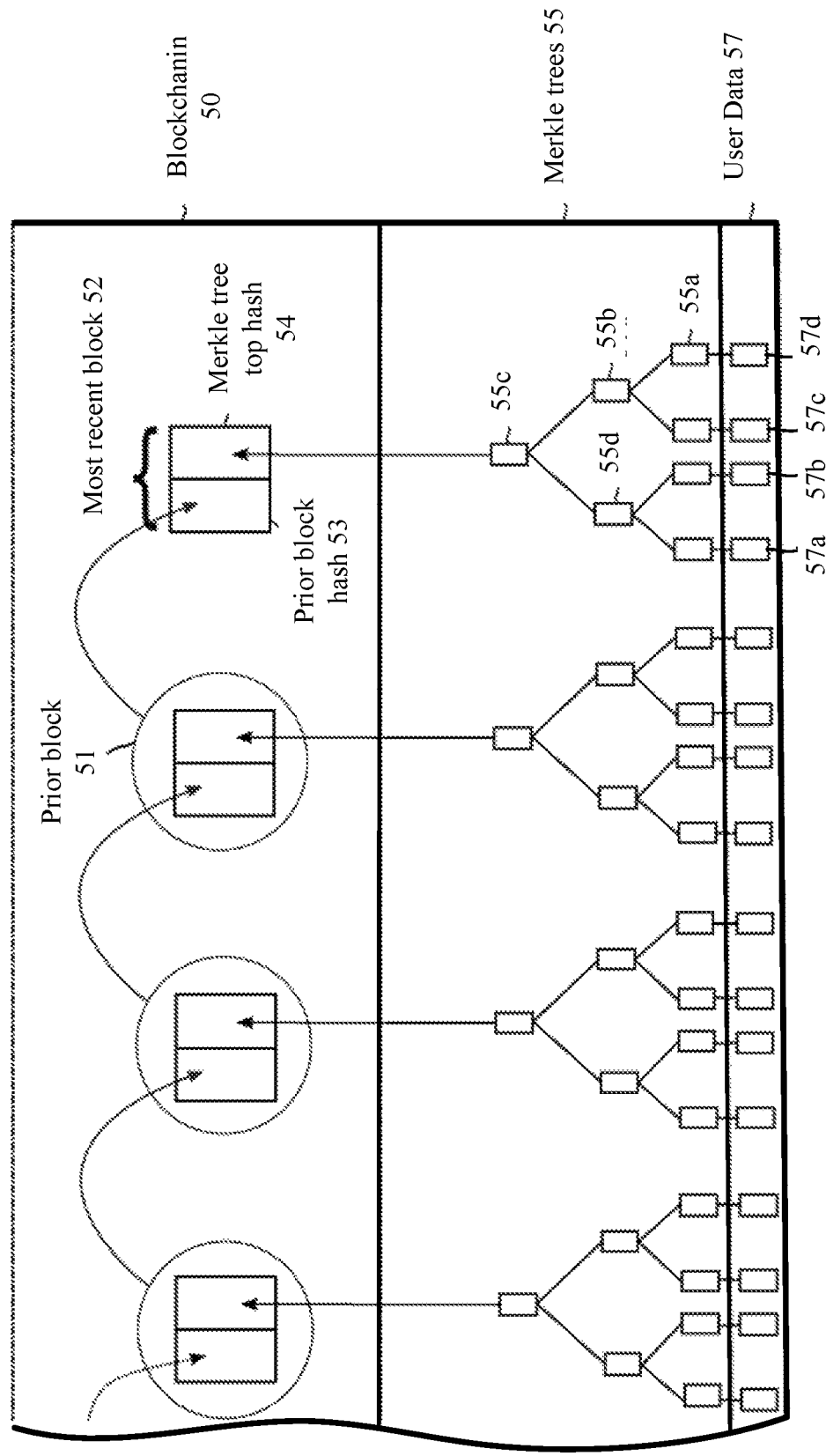
FIG. 3 is a block diagram that illustrates an exemplary blockchain format that may be used with the system of FIG. 1.

Also shown in FIG. 2 are one or more chain states 26g that includes a portion of a blockchain 50 (FIG. 3). Along with each chain state 26g is an origin block 26g1 and the most recent block 26g2. Each satellite 12 may have a respective owner and each satellite 12 and respective owner system 14 may communicate with one another via two-way (or one way) ground-based satellite communication equipment (not explicitly shown in FIG. 1). In general, each satellite owner system 14 may be used for protecting availability of the corresponding satellite 12 from abuse such as denial of service attack via excessive use or deliberate transmission of malicious commands, initiating maneuvers to avoid space debris or other satellites and for extracting usage fees (if any) from committer, observer, user or other systems. The satellite owner systems 14a-14b may protect the availability of their respective satellite 12a-12b, to not lose access to usage fee revenues. Failure of the satellite owner to maintain access may result in loss of availability of their respective satellites 12 and a loss of availability of all satellites 12 in a given system 10 may compromise availability of blockchains for adding new blocks, although historical integrity would not be compromised. Protocol 1 chains (discussed below) may therefore be resumed after the launch of replacement satellites.

The committer systems 16a-16d communicate with associated satellites 12a, 12b, etc., via one-way or two-way ground-based satellite communication equipment (not explicitly shown in FIG. 1). Optional one-way (or two-way) ground-based satellite receiver equipment (not explicitly shown in FIG. 1) may be provided so that the users (generally 18) may participate in the system 10. The optional observer systems 19 may audit operation of the system 10, and any other interested stakeholders (e.g., regulatory authorities or security researchers) can observe how the system 10 operates and contribute independent assessment and/or feedback to improve the system 10 or to further attest to its security.

In various embodiments, as noted above, there may be one or more committers, e.g., 16a, 16b per satellite, e.g., satellite 12a. The committers 16a-16d are provided with replaceable CSKs that are in turn furnished by the respective satellite owner 14, in order to commit new blocks to the respective satellite 12. The committers 16a-16d may add new blocks to the blockchain (e.g., in exchange for user fees) and periodically furnish proof to their respective satellites that majority consensus remains. Failure of the committers 16a-16d to perform tasks correctly may at worst result in temporary non-availability of their respective satellites 12, as well as loss of status as a committer, as will be described in further detail below. Alternatively, owners 14 may function as committers 16, or the entire network could even have a single owner who is also the single committer, and possibly even the single user, perhaps with a correspondingly simplified protocol. Intermediate options in this range are also possible.

In various embodiments, the system 10 may include multiple (perhaps a large number) of user systems, e.g., 18a-18n per committer system, e.g., 16a. In general, the user systems 18a-18n may be any suitable electronic device that has data whose integrity is to be secured whether on Earth or in space, and which integrity may be verified by providing hashes of the data to their respective committer systems 16a-16d for aggregation and submission to the blockchain in the form of new blocks.

Referring now to FIG. 3, an exemplary blockchain 50 that is secured by the system 10 is shown. The four most recent blocks of the blockchain 50 are shown. More particularly, as shown in FIG. 3, the blockchain comprises a plurality of blocks (typically many more than just the four shown), two of which, a prior block 51 and a most recent block 52 are referenced. Each of the plurality of blocks include a pair of data fields, as referenced for the most recent block 52. A first data field 53 stores a hash value of the prior block 51 and a second data field 54 stores a Merkle tree top hash value (also known as a Merkle tree root hash value). These fields may have the same number of bits. For example, in various embodiments, the first data field 53 and a second data field 54 may each be 256-bits such that the block 52 has a total of 512 bits.

The second data field 54 may secure the user data 57a-d associated with the most recent block 52. For example, the data field 54 may be comprised of a Merkle Tree Root Hash 55c (which may be computed from user data 57a-d by an appropriate committer system 16a-16d as described in more detail below). The user data records 57a-57d may be supplied to the committer system by its user systems. Should a purported copy of user data ever fail to relate to the blockchain via Merkle trees, then tampering of the block would be evident.

As with all prior blocks in this blockchain, the field 54 in most recent block 52 is the representation of user data records 57a, 57b, 57c, and 57d. These records 57a, 57b, 57c, and 57d are iteratively hashed pairwise together in order to compute the hash value in field 54. For example, user data record 57d is hashed to yield 55a, which is concatenated to the hash of 57c and then this concatenated result is hashed again to yield 55b. Hash 55d is derived in an analogous manner from user records 57a and 57b. Hash 55b is concatenated to 55d and this concatenated result is hashed again to yield hash 55c, which becomes the hash value that is stored in field 54. (Although in this illustration exactly four user data records are shown per block, any finite and perhaps very large number of user data records may be included.)

The other field 53 in the most recent block 52 is a hash of the entire prior block 51. That prior block 51 was derived from a set of prior user data records and from a still previous block in the same manner as was block 52. Thus, all blocks are recursively linked together via hashes of each other. If a block (such as block 51) did not hash to the value recorded in the next block (such as data field 53) in a purported blockchain copy, then tampering of the blockchain would be evident. Because of these links, tamper resistance is assured for all prior blocks under the assumption that the most recent block 52 is correct. However, this assurance does not extend to the most recent block 52, because the most recent block 52 does not yet have a next block within which to record its hash value. If the integrity of block 52 cannot be certain, then the integrity of block 51, or of any prior block cannot be certain, since all records of block hashes would be suspect.

The system 10 and associated processes described herein provide a mechanism to assure the tamper resistance of the most recent block 52. This assurance mechanism is provided by features of the disclosed system 10 and associated processes. One feature is the inherent difficulty of human access to the node 20 due to the remote location of the node 20. Another feature that provides the assurance mechanism is when and how VSK key generation occurs. Another assurance mechanism is that the private key of the VSK pair is only known to the node 20 on the satellite 12. Another assurance mechanism is that a plurality of nodes 20 may contribute their individual security into a more secure sum.

The system 10 and associated processes do not require the economic and energy waste associated with Proof of Work for electricity generation to power computers to solve Proof of Work algorithms. The system 10 and associated process security are not vulnerable to currency price collapse, unlike Proof of Work. The system 10 and associated processes are not susceptible to the miner's 51% attack that is a drawback of the Proof of Work approach. The system 10 and associated processes may employ mitigations to quantum and classical cryptanalysis that are difficult or impractical in Proof of Work. (The nature of Proof of Work may make it more difficult to deploy cryptanalytic mitigation techniques such as cryptographic redundancy (using multiple hash functions of different designs in parallel) without harming other efficiency and security characteristics.) The system 10 and process 26 are not practically limited to cryptocurrency contexts, as there is no incentive mechanism required to fund some chosen form of waste, as with Proof of Work.

The system 10 and associated processes do not require a set of "validators" to stake a certain amount of cryptocurrency, whereas Proof of Stake algorithms require this and are thus generally limited to cryptocurrency contexts. Proof of Stake algorithms also involve long-term exposure of public signing keys, yet in a manner that is not compatible with certain techniques such as TESLA authentication, thus increasing vulnerability to quantum or classical cryptanalysis, whereas system 10 and associated processes do not. The system 10 and associated process security are not vulnerable to currency price collapse, unlike Proof of Stake.

The system 10 and process 26 do not rely on trust relationships among terrestrial entities (comprised of, or physically accessible to humans and therefore corruptible), to sign the most recent block.

After computing a Merkle Root Hash, and constructing the next block 52 for use in a production command to add the next block to a blockchain 50, a committer may furnish to each user system just the necessary adjacent elements of the Merkle tree 55 necessary for each user to later verify inclusion of their hash in the Merkle root hash, as signed by the corresponding satellite, e.g., 12a. However, those skilled in the art will appreciate that the committer system 16a-16b may suitably furnish to each user system the entire Merkle tree 57a or any suitable portion thereof.

In various embodiments, the first data field 53 may be a SHA256 hash or another suitable hash based on a prior block 51 in the blockchain 50. As such, the most recent block 52 in the blockchain 50 may be said to "reference" the prior block 51 (and so forth) if the SHA256 hash of the referenced block is the same bit sequence as a first data field of the referencing block. For example, in context with FIG. 3, block 52 properly references prior block 51 if the SHA256 hash of the prior block 51 is identical to the bits stored in the first data field 53 of block 52. In various embodiments, the blockchain 50 may be configured in such a way that each user pays a commitment fee to the corresponding committer once a majority of satellite VSKs has been observed.

This blockchain format 50 as described herein and illustrated in FIG. 3, is intended to be exemplary only. Other suitable data structures may be employed. For example, one alternative format may employ redundant hash functions of substantially different schemes, which may offer better long-term protection against future quantum and classical cryptanalytic-based compromises.

Protocol 0/Protocol 1 Overview

Described below are specific approaches to implementing the system 10 in a manner that combines low-level simplicity and modularity with system-level robustness and upgradeability. In Protocol 0, the data processing node 20 of an individual satellite cryptographically signs chained blocks incorporating data presented to the data processing node 20 to form one or more blockchains specific to the data processing node 20 on that satellite. In Protocol 1, a set of several such satellites each of which executes Protocol 0, are aggregated by users, committers, and other interested parties as specified in Protocol 1, combining outputs of an adjustable number of individual satellites to form virtual blockchains used directly by the system's customers.

These Protocol 1 "virtual blockchains" are secured by "virtual witnesses." A virtual witness is a process/system that runs as an emulation (software and/or hardware) process on any of a number of systems. Each virtual witness is identified by a participating satellite's VSK. A virtual witness's behavior is emulated by each interested system participant in accordance with FIGS. 5A-5C (below), for purpose of interpreting the Protocol 1 commands that the participant finds in that satellite's associated Protocol 0 blockchain. (Interested systems may be committer systems 16, owner systems 14, user systems 18, observer systems 19, or other systems.) In discussion which follows, references to a "committer's virtual witness" refer to a committer's virtual witness emulation in accordance with FIGS. 5A-5C, while reviewing the protocol 0 blockchain associated with their satellite's VSK for the protocol 1 blockchain under discussion. These virtual blockchains provide even greater tamper resistance and flexibility than any one of the Protocol 0 blockchains due to the contributions under adjustable rules and adjustable membership of participating satellites. This two-protocol structure provides the system 10 as a whole with increased upgradeability, maintainability and lower effective latency than any single satellite could provide.

Figure 4A:
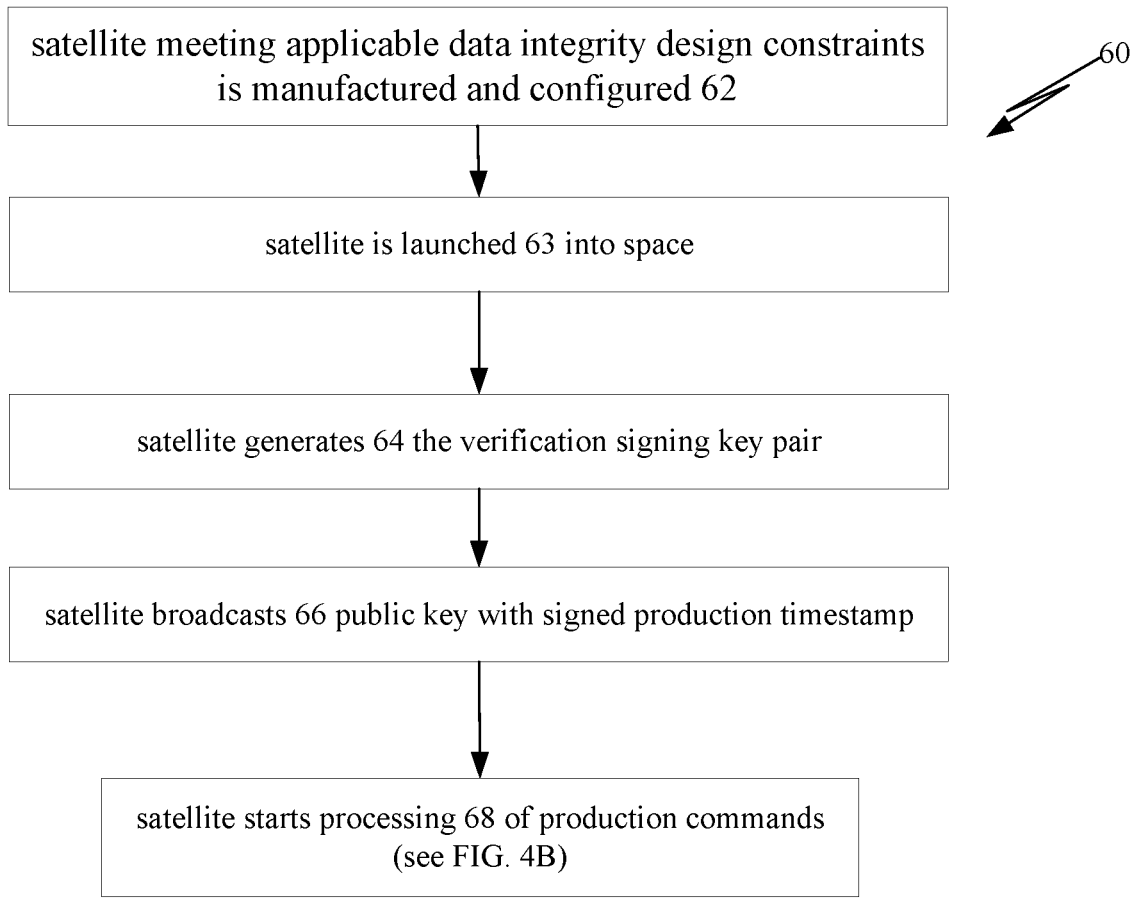
FIGS. 4A-4D are flow diagrams that depict processes carried out at spacecraft and/or other physically inaccessible platforms for processing production commands on blockchains and other data structures.
Figure 4B:
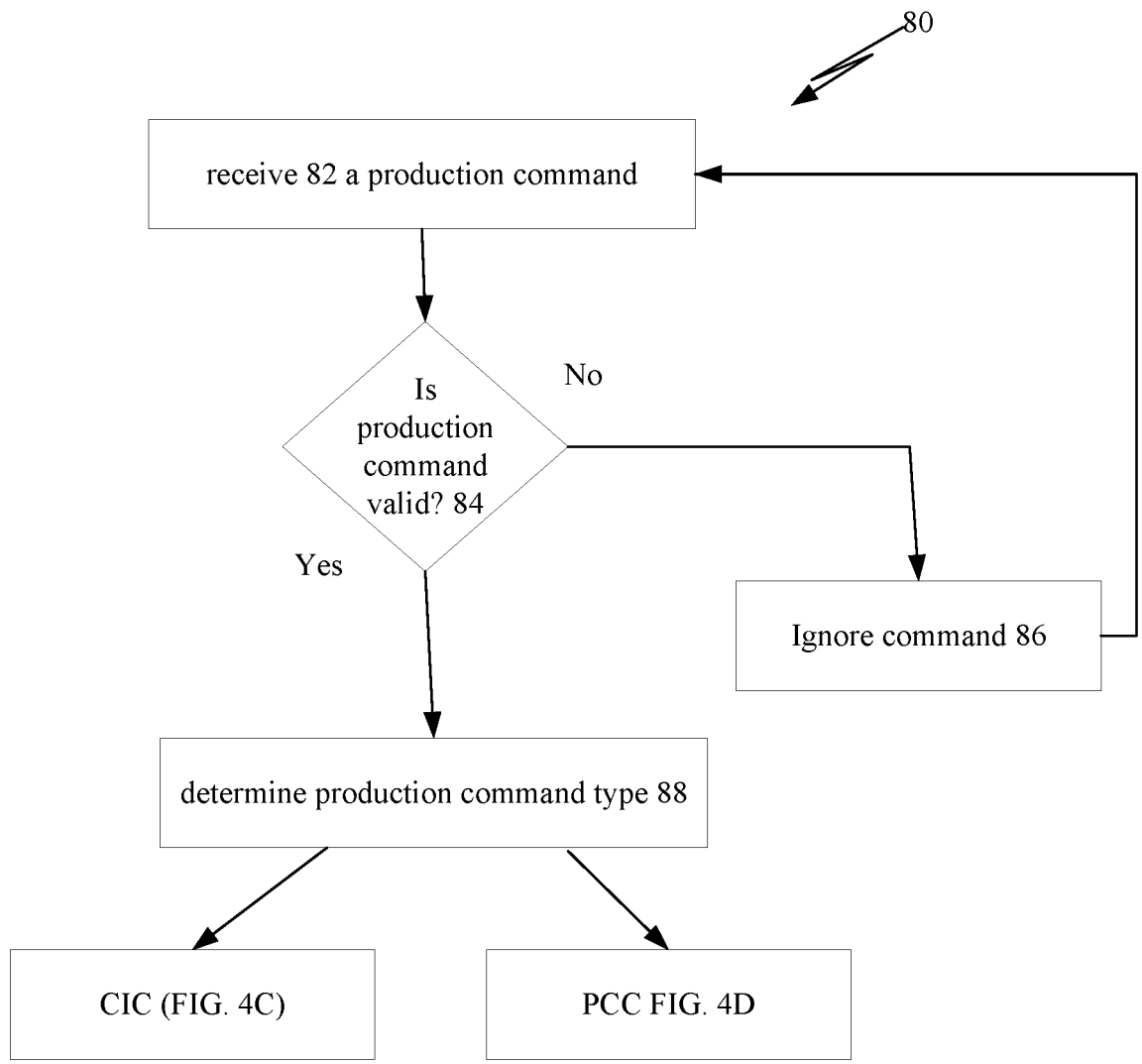
Figure 4C:
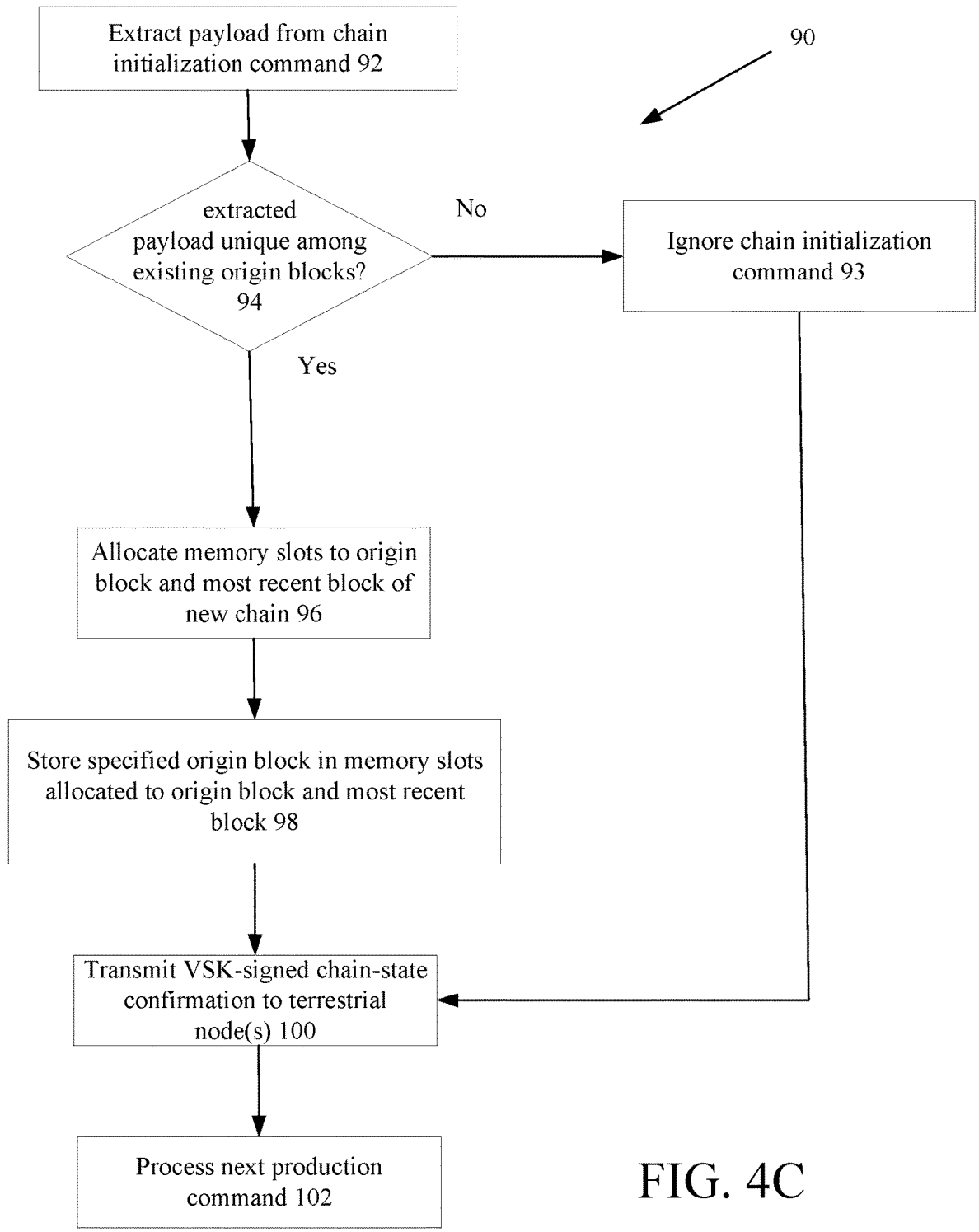
Figure 4D:
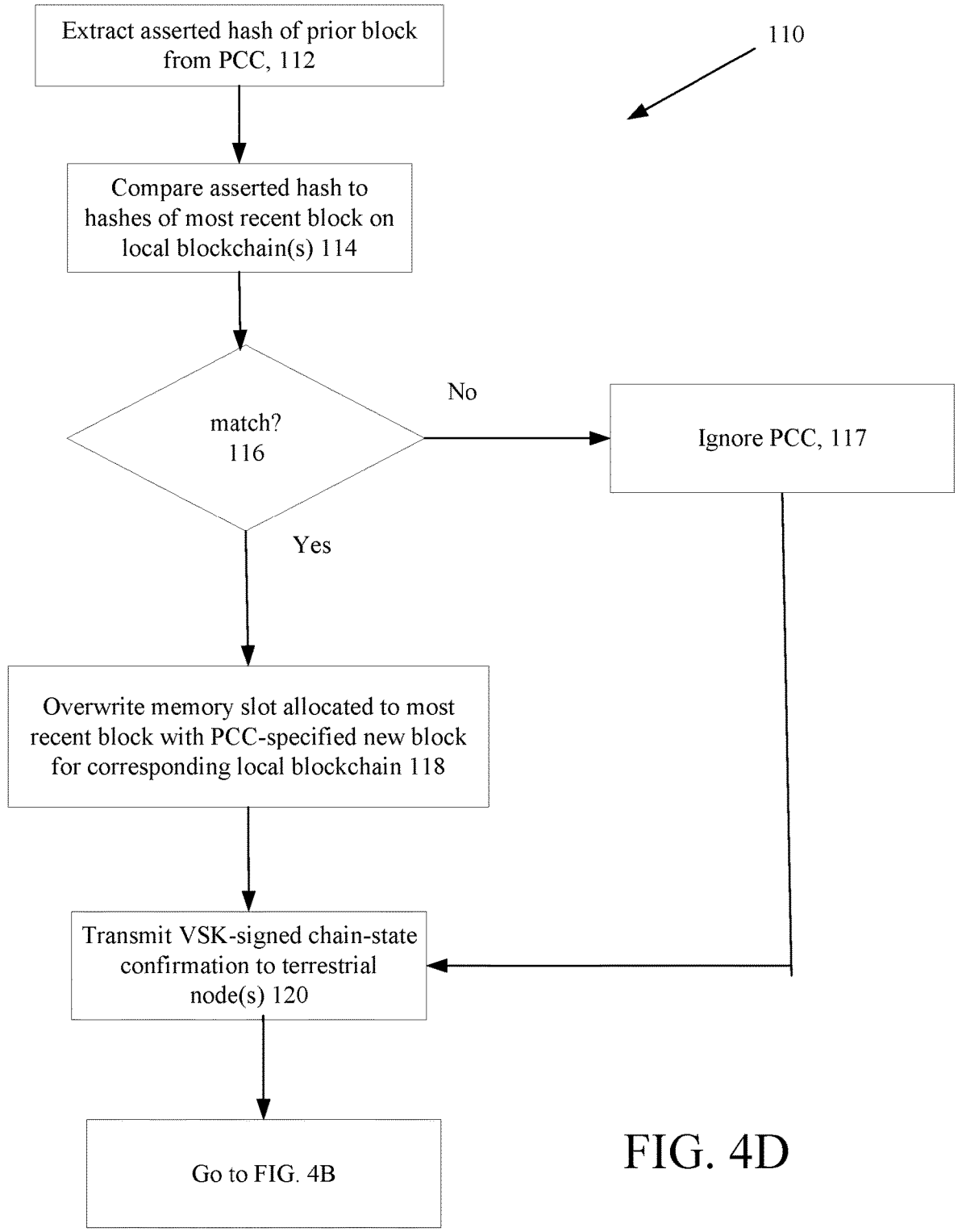

Referring now to FIGS. 4A-4D, exemplary processes that are part of Protocol 0 are shown for high-integrity functional securing of information in blockchains and other data structures. Each participating satellite node 20 produces, extends, and signs its own expandable collection of blockchains in response to committer-signed commands. Committers may periodically repurchase the right to issue "Production Commands" from satellite owners by purchasing satellite-specific "Committer Signing Keys" (CSKs) that automatically expire after a certain number of commands and/or amount of time. Automatic CSK expiration may serve the dual purpose of limiting denial-of-service attacks by malicious committers, while also motivating periodic payment to owners. To enable this, satellites are built, configured, deployed, and made to receive and respond to Production Commands as further detailed below Protocol 0 Setup Referring first to FIG. 4A, a process 60 is shown. A satellite for use in the process 60 meeting the applicable data integrity design constraints is manufactured and configured 62. Once the satellite 12 meeting these constructions is received, the satellite is launched 63 into an orbit. For example, the satellite may be launched into a low Earth orbit (LEO), a geostationary orbit (GEO), a geosynchronous orbit (GSO), a Mars intercept orbit, or another suitable orbit depending on data integrity requirements, technological capabilities, etc. Once deployed, the deployment indicator 31 signals the data processing node 20 to generate the VSK 26d as shown in FIG. 4A item 64. The data processing node 20 then broadcasts 66 the public key portion only of the VSK, along with the VSK-signed timestamp of creation, back to users (and may continue doing so periodically.) The data processing node 20 is now ready to process production commands 68.

The data node 20 on the satellite 12a may further enable a periodic rebroadcast of the VSK public key. The private key is not broadcasted and instead is kept secret even from the owner system. Furthermore, on Earth, the satellite owner system(s) 14 may exchange their VSK public keys with each other until all participants are confident that they know the public VSK belonging to each owner's satellite 12a, 12b, etc., as may later be helpful for protocol 1.

The satellite 12a may receive a post-launch configuration command to indicate that the post-launch configuration phase is complete. As such, the satellite 12a and/or the data processing 20 may blow an on-board fuse or otherwise trigger an appropriate one-time mechanism to permanently disable post-launch configuration commands and to enable production mode operation, described in further detail below with reference to FIGS. 4B-4D. Furthermore, the satellite may be configured to append notice to indicate that setup commands have been permanently disabled to all subsequent transmissions of configured public VSKs.

Protocol 0 Operation

Referring now to FIG. 4B, a process 80 for receiving and validating an appropriate production command during operation mode is shown. More particularly, the data processing node 20 receives 82 a production command from committer systems 16 (FIG. 1) and subsequently determines 84 whether the production command is valid. For example, a production command is accepted when signed by a satellite-specific replaceable CSK. A production command is also only accepted as valid if satellite-specific replaceable CSK has not yet expired, either due to use on the maximum number of blocks or through passage of maximum time, whichever comes first, as may be specified by the expiration algorithms 26f (FIG. 2).

In response to determining 84 that the incoming production command is not signed by a satellite-specific CSK or alternatively has expired, the data processing node 20 ignores the commit command. However, if the production command is properly signed by a satellite-specific CSK and is still valid, the data processing node 20 determines 88 a type associated with the commit command. For example, the production command may be a Chain Initialization Command (CIC) for producing a new blockchain or may be a Payload Commit Command (PCC) to extend an existing blockchain by adding a new block to that blockchain.

A Chain Initialization Command (CIC) is a command to produce a new Protocol 0 blockchain, which in this example, is open to any authorized committer 16, but could reasonably be restricted to just special committers or just to the owner, if preferred by the owner—depending on processing node 20 storage and processing capabilities, as well as desired pricing policies, etc.

Accordingly, as shown in FIG. 4B, the satellite may process the CIC, as illustrated in FIG. 4C when the valid production command is intended to initialize a new blockchain. Otherwise, when the valid production command is intended to add a new block to an existing blockchain, the satellite may process the Payload Commit Command (PCC), as illustrated in FIG. 4D.

Referring now to FIG. 4C, chain initialization command (CIC) processing 90 is shown. A satellite owner system 14 or committer 16 transmits a chain initialization command (CIC) to its satellite 12 for purpose of initializing a new blockchain on the satellite 12a. The CIC typically will include a payload for a new origin block, and the CIC is signed by an owner signing key (OSK) or CSK for that satellite 12. The payload is the data which is to comprise the contents of the origin (i.e. first) block for the new chain. Because the origin block, by definition, has no prior block to reference, the amount of data in the payload is the size of a typical block's prior block hash 53, plus the size of a Merkle tree top hash 54. (The meaning of the underlying hashed data is up to the committer, in some applications the first portion might actually be the hash value of a block of another chain that is to be virtually extended, or may be a hash of the detailed rule implementation for Protocol 1 including a list of initially participating VSKs as well as rules for changing the VSK list.)

Upon receiving a properly signed CIC, the data processing node 20 of the target satellite 12 extracts 92 the payload from the CIC and determines 94 whether the payload is unique among all other origin blocks for existing chains on that satellite. If the payload is not unique, the data processing node 20 of the target satellite 12 may ignore 93 the CIC and optionally transmit a chain state confirmation (CSC) message 100 to any interested terrestrial nodes Earth 100 (meaning, transmit the origin block 26g1 and the latest block 26g2, and also broadcast a VSK signature for this pair.) This gracefully handles accidental CIC duplication.

Otherwise, the data processing node 20 of the target satellite 12a confirms that the payload is unique among all other origin blocks for existing chains, and allocates 96 local previously unused persistent memory (e.g., persistent storage) slots to the new chain, each of which is sufficient to store one block. For example, in various embodiments, the data processing node 20 of the target satellite 12a may allocate two memory slots that are dedicated to the new chain, including a first memory slot 26g1 configured to store an origin block for the new chain and a second memory slot 26g2 configured to store a most recent block for the new chain.

The data processing node 20 of the target satellite 12 may store 98 the payload associated with the CIC, which is intended to be a new origin block, in the memory slot allocated to the origin block for the new chain. Furthermore, the satellite may also store the payload associated with the CIC in the memory slot allocated to the most recent block for the new chain, as the origin block is also the most recent block at the time that a new chain is initialized.

The data processing node 20 of the target satellite 12 transmits 100 a chain-state confirmation message to interested terrestrial nodes. The chain-state confirmation message may include a first data field containing a copy of the origin block, a second data field that contains the most recent block (also the origin block in this case), and a third data field that contains a VSK-derived signature of a concatenation of the first and second data fields. The data processing node 20 now processes the next production command 82.

Referring now to FIG. 4D, processing for a payload commit command (PCC) is shown. A committer may transmit a (PCC) to the satellite for the purpose of committing a new block to one of the multiple blockchains maintained at that satellite. A Payload Commit Command (PCC) as processed in FIG. 4D is a command to append to an existing blockchain. To process a PCC, the data processing node 20 of the satellite 12 extracts 112 the asserted hash of the prior block (i.e., the first field) from the PCC. The processing node 20 compares 114 this to the hash of the most recent block 26g2 of all locally stored chain states 26g to look for a match. If a match is not found 116, then the processing node 20 ignores 117 the PCC, transmits chain state confirmations 120 for all local blockchain states 26g to Earth for interested observers such as committers 16 before resuming normal processing 82.

This serves as an error message, and provides helpful information for identifying the most recent block of whichever chain was intended, in event of an accidental race condition.

However, if the satellite finds a match 116, the node 20 overwrites the most recent block slot 26g2 whose contents had matched with the new payload's prior hash, and broadcasts 120 a VSK-signed chain state confirmation message for all chain states 26g back to interested terrestrial nodes on Earth, before receiving 82 the next command.

The chain-state confirmation message may include a first data field containing a copy of the origin block hash, a second data field that contains the most recent block (the new block specified in the PCC), and a third data field that contains a VSK-derived signature of a concatenation of the first two data fields.

Maintenance of Archives

Protocol 0 focuses on tamper resistance. For scalability and cost efficiency, it provides no protection against (perhaps maliciously arranged) gaps in archived chain state data, since that is more efficiently mitigated on Earth.

In one implementation therefore there could be sufficient storage to maintain archives on the satellite. One skilled in the art will recognize that approach (expanding satellite-side chain storage 26g to include every block ever added to a chain), would involve scalability and cost efficiency limitations in exchange for addressing a data availability matter that could be more easily addressed on Earth, and thus in most contexts this approach may be inadvisable.

However, most committers would be highly motivated to maintain and share archives. In implementations where these satellites did not store full archives, which might be the most common situation, it may be desirable to ensure successful reception by assigned archivists on Earth. One simple strategy is for each blockchain to have an associated ring buffer for the most recent N blocks, to include all most recent N blocks in chain state confirmation broadcasts, to receive signed messages from archivists confirming their most recent successful reception, and to stop accepting new PCCs for a given chain anytime doing so would imply overwriting a block for which fewer than (say) $\frac{2}{3}$rds of assigned archivists have confirmed reception.

Protocol 1 Operation

Committers 16 sharing a Protocol 1 blockchain 50 take turns defining new protocol 1 blocks. One way to do this is to first group together all committers who share a satellite 12, and then have these groups take turns, with each of the committers in a group taking turns. For example, 16a and 16b are in one group, 16c and 16d are in another. Each time a group has a turn, it selects the next of its member committers to supply the block for that group's turn. A protocol 1 virtual blockchain may have a convention (whose documentation is secured by its protocol 0 origin blocks) stating that any committer who delays more than some pre-specified amount of time, automatically forfeits their turn to the next committer. In the unlikely event of an uncooperative committer who consistently violates the turn-taking norms of its protocol 1 blockchain, the corresponding satellite owner may choose to stop selling both protocol 0 CSKs and protocol 1 CSKs to that committer. (Protocol 1 CSKs are analogous to Protocol 0 CSKs, but differ in that they are used to sign Protocol 1 commands (not protocol 0 commands), and in that they are not derived from a Protocol 0 secret random data string 26e but may be like conventional public/private key pairs under a conventional public key infrastructure (PKI) setup such that committers and other system participants are able to verify each other's protocol 1 CSK signatures. In context of the protocol 1 discussion below, "CSK" refers to "protocol 1 CSK".)

A committer 16 produces a new protocol 1 block by accepting data hashes from its users 18, and deriving a Merkle tree top hash as described above, which it then appends to a hash of the prior Protocol 1 block. After first confirming that their local systems are in an appropriate state, the committer records the block in the form of a protocol 1 "Add New Block" virtual command, which is hashed and committed to their protocol 0 chain as the Merkle tree top hash (a tree with only one leaf).

The committer sends the resulting protocol 0 Chain State Confirmation message that they receive from their satellite to all other committers who are sharing this protocol 1 virtual blockchain, so that they can ensure that their associated protocol 0 blockchains are also in the correct state for receiving new blocks. A protocol 0 blockchain is in the correct state for receiving a new protocol 1 block if the processing by the associated virtual witness of an "Add New Block" command will result in a new provisionally valid block (FIG. 5B) and without the committer's key being blacklisted by that virtual witness. To do this, the committer ensures that their virtual witness knows the latest block, which the committer can receive from its cooperating peers in the event that it does not otherwise have knowledge of the latest block. To do this, the committer's virtual witness needs to have received a validation command recently enough. If it hasn't, then they first record a validation command on the associated Protocol 0 chain which contains signatures on the most recent block from a majority of other participating virtual witnesses. Once their virtual witness is current, and has a sufficiently recent validation, then it is in a state appropriate for receiving an Add New Block command.

Whenever a committer 16, user 18, owner 14, observer 19, or other interested party wishes to determine the state of a Protocol 1 blockchain 50, they simply emulate the logic of a protocol 1 virtual witness as they review the history of the protocol 1 virtual commands secured by a participating protocol 0 blockchain, as summarized in FIG. 5.

Figure 5A:
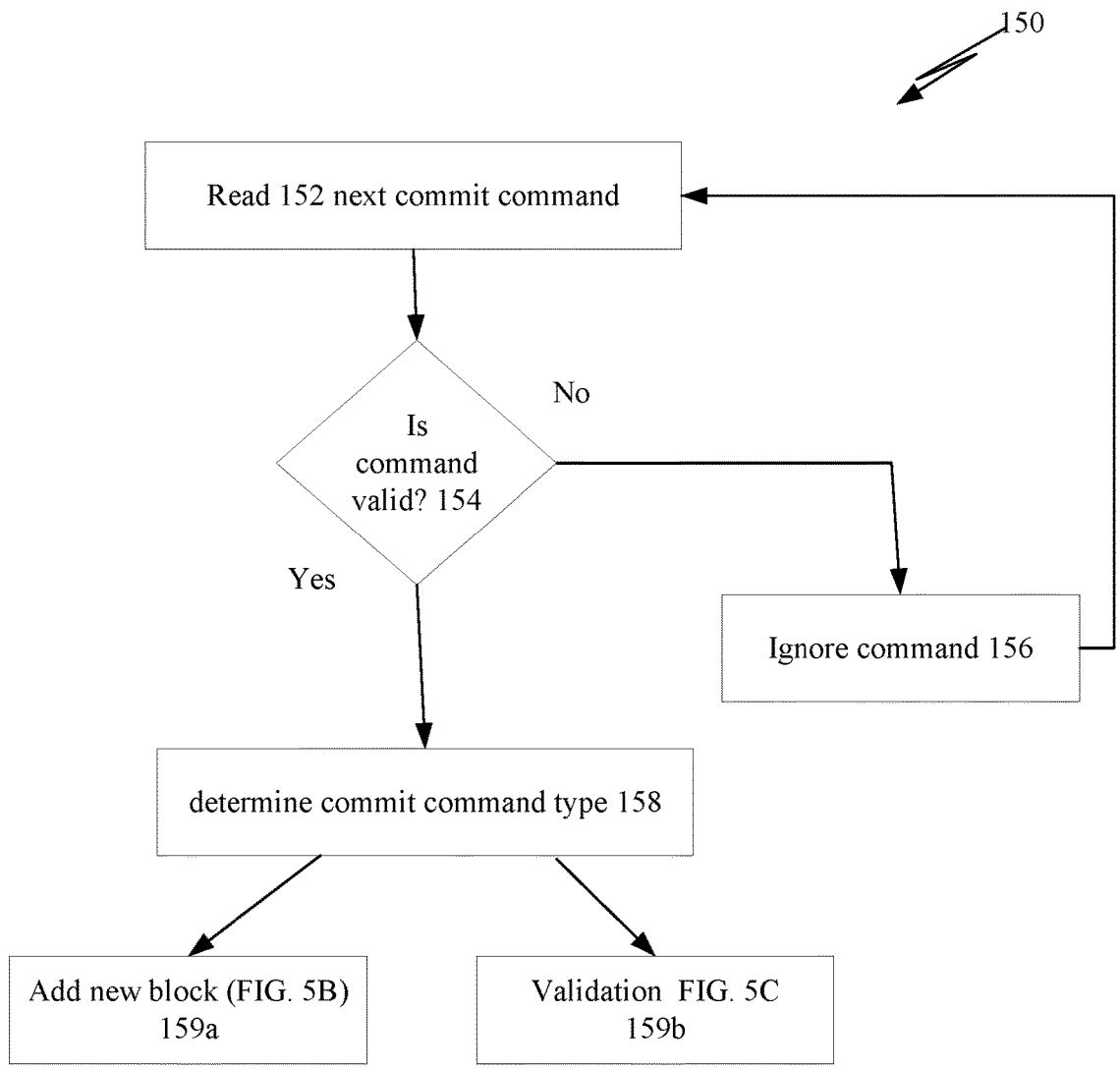
FIGS. 5A-5C are flow diagrams that depict processes for combining a plurality of spacecraft into a more secure and flexible aggregate system.

Referring now to FIG. 5A, a process 150 for reading and validating appropriate commit commands is shown. More particularly, the virtual witness reads 152 a commit command and subsequently determines 154 whether the commit command is valid. For example, a commit command is accepted when signed by a virtual witness-specific replaceable Protocol 1 CSK that does not appear on a local blacklist associated with that virtual witness and that has not expired. In response to determining 154 that the incoming commit command is not signed by a virtual witness-specific protocol 1 CSK or alternatively determining that the CSK used to sign the commit command appears on the local blacklist or has expired, the virtual witness ignores the commit command.

However, if the commit command is properly signed by a virtual witness-specific CSK that does not appear on the local blacklist and has not expired, the virtual witness determines that the commit command is valid and so determines 158 a type associated with the commit command. For example, the commit command may be a command to add a new block 159*a* to the blockchain 50 or may be a validation command 159*b* intended to provide the virtual witness with cryptographic proof that the virtual witness is in agreement with a majority of participating virtual witnesses, as to the entire virtual blockchain state up to the block referenced by the validation command.

Figure 5B:
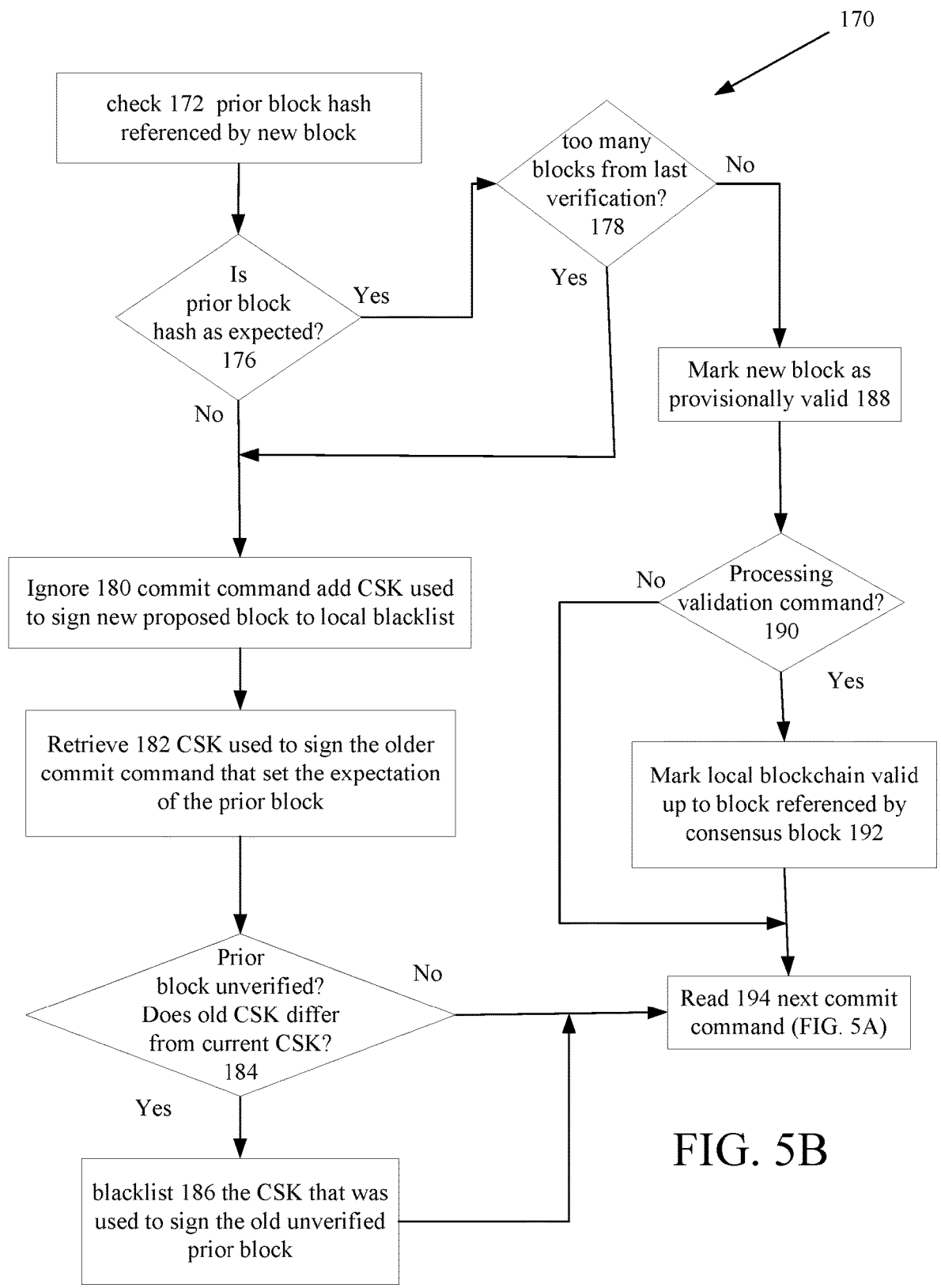
Figure 5C:
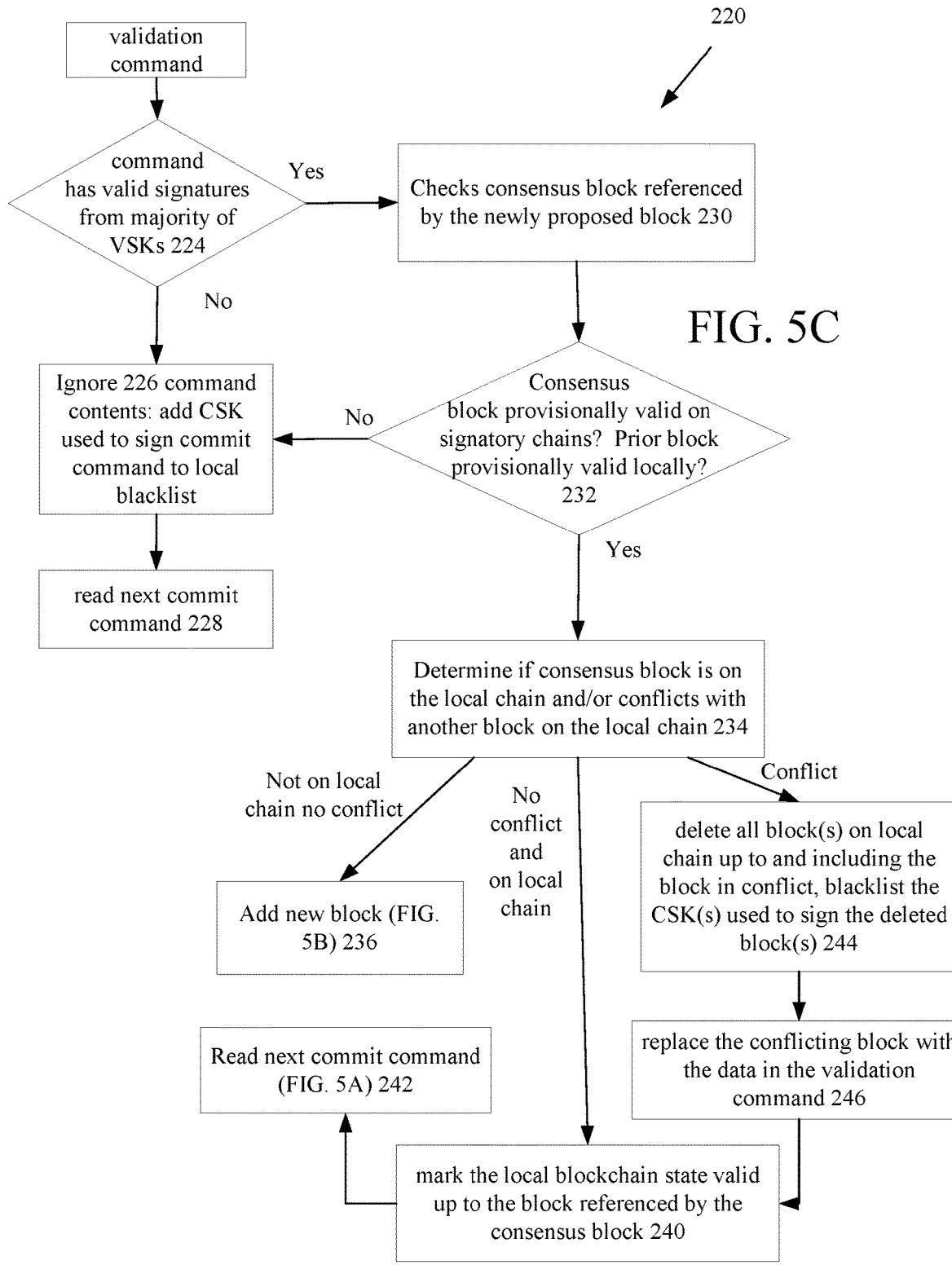

Accordingly, the virtual witness may process the commit command, as illustrated in FIG. 5B or process the validate command, as illustrated in FIG. 5C.

Referring now to FIG. 5B, processing 170 for adding a next block to the virtual blockchain 50 is shown. The virtual witness reads 172 the prior block hash referenced by the new block in the commit command. The virtual witness determines 176 whether the prior block hash as referenced by the newly proposed block is as expected—i.e. if it is the most recent block on the virtual blockchain. If the virtual witness determines that the prior block hash as referenced by the proposed block is not as expected, the virtual witness may ignore the commit command contents and add 180 the CSK to a local blacklist. If the most recent block on the virtual blockchain is not yet verified by a validation command and was also signed by a protocol 1 CSK different than that of the commit command currently being processed, then the virtual witness may further add this different CSK to the blacklist.

In response, if the virtual witness determines 176 that the prior block hash is as expected, e.g., is the expected prior block hash, the virtual witness may determine 178 whether there are too many blocks that have passed since a last verification command was received to verify the blockchain state.

For example, if the virtual witness has not read a verification command within a given block count (e.g., ten blocks), then the virtual witness may blacklist the CSK that was used to sign the commit command used to add the most recent block. Thus, any committer who is making use of their protocol 1 CSK to commit data to the blockchain has an incentive to provide regular proof to the satellite that it is not on a minority fork and to avoid sending any commands to add new blocks that are likely to result in a fork. A fork occurs when not all virtual witnesses agree (up to their latest information) on a state of the virtual blockchain.

In the event that the virtual witness determines that the number of blocks added to the chain since the last verification exceeds the applicable block count, the virtual witness may ignore the commit command contents and add 180 the CSK to the local blacklist.

Furthermore, the virtual witness may retrieve 182 the protocol 1 CSK that was used to sign the older commit command that had set the expectation of the prior block. The virtual witness determines 184, whether the older commit command was signed by a protocol 1 CSK that differs from the current commit command, and determines whether the virtual witness has not yet received a validation command proving majority satellite consensus behind the unverified older block 184. If both conditions are satisfied, the virtual witness may also blacklist 186 the protocol 1 CSK that was used to sign the old unverified prior block, and in any case then reads 194 the next commit command as per FIG. 5A.

If the newly proposed block correctly references the expected prior block and the number of blocks added to the chain since the last verification does not exceed the applicable block count, the virtual witness marks 188 the new block as provisionally valid and determines whether it is processing a validation command. If yes, the virtual witness marks 192 the local blockchain globally valid up to block referenced by consensus block (including the marked provisionally valid new block). If the virtual witness is not processing a validation command, the virtual witness reads the next commit command (FIG. 5A).

Thus, if the prior block as referenced by the newly proposed block fails to reference what the virtual witness believes to be the prior block (i.e., the prior block hash is not as expected), then the virtual witness ignores the contents of the commit command and blacklists at least the protocol 1 CSK used to sign the newly proposed block that conflicts with the expected prior block. Furthermore, the virtual witness may recall the protocol 1 CSK that was used to sign the older commit command that had set expectation of the prior block that is now in conflict with the newly proposed block. If that older commit command was signed by a protocol 1 CSK that differs from the current commit command and the virtual witness has not yet read a validation command proving majority satellite consensus behind the expected prior block, then the satellite may also blacklist the protocol 1 CSK used to sign the expected prior block.

Thus, when a commit command seeking to add a new block to the virtual chain includes a prior block hash that is not as expected, either one or two committers to the corresponding virtual blockchain are unable to make further use of the virtual blockchain unless and until the satellite owner issues one or more new protocol 1 CSKs to these committers of dubious data. If however the satellite owner finds it inappropriate to issue a replacement protocol 1 CSK, then the owner may furthermore also allow the protocol 0 CSK to expire without further replacement.

Referring now to FIG. 5C, a process 220 for reading and interpreting properly signed validation commands is shown.

Validation commands are used to provide a virtual witness with cryptographic proof that it is in agreement with a majority of participating virtual witnesses. This process 220 is used to prove that there is majority agreement as to the entire virtual blockchain state up to the block referenced by the validation command or to provide the virtual witness with sufficient data to transition off a minority fork if the virtual witness is not in agreement with a majority of participating virtual witnesses as to the entire blockchain state up to the block referenced by the validation command. A proper validation command generally contains a list of VSK signatures on a single block from a majority of satellites along with the block itself.

The virtual witness determines 224 whether the validation command has valid signatures from a majority of VSKs. If not, the satellite may simply ignore 226 the commit command, add CSK(s) to blacklist, and read 228 the next command as per FIG. 5A. Otherwise, if the commit command does have valid signatures from a majority of VSKs, the virtual witness checks 230 the consensus block referenced by the newly proposed block. The virtual witness determines 232 whether the consensus block is provisionally valid on all signatory protocol 0 chains (by emulating corresponding virtual witnesses) and whether the prior block is provisionally valid on the local virtual blockchain (FIG. 5B).

If both conditions are satisfied, the process 220 determines 234 whether the block appears on the local virtual blockchain maintained by this virtual witness and/or conflicts with another block on the virtual blockchain. (The consensus block is said to conflict with a local block if it has the same prior block hash (53) as a block (or a block's ancestor) on the local chain, and yet is different than the local block with that same prior block hash due to a difference in Merkle tree top hash 54. A local block is said to be "globally validated" if it has been marked as such due to prior successful processing of a Blockchain Validation command.) If the block does not appear on the virtual chain and there is no conflict, the new block is added (FIG. 5B). If there is no conflict and it is on the virtual chain, the process marks 240 the virtual blockchain state valid up to the block referenced by the consensus block, and the virtual witness reads 242 the next commit command.

If there is a conflict, the virtual witness deletes 244 all blocks on the local chain up to and including the block in conflict, and blacklist the protocol 1 CSK(s) used to sign the deleted block(s), and replaces 246 the conflicting block with the data in the current commit command before marking the local blockchain state valid up to the block referenced by the consensus block.

Thus, when the validation command has valid signatures from a majority of VSKs and the block does appear on the local chain, and also the virtual witness determines that the consensus block is not on the local chain but does not conflict with another block on the local chain, then the current validation command is treated like a commit command to add the consensus block to the local chain followed by a command to validate the blockchain state up to and including the block referenced by the consensus block.

If the consensus block correctly references a block on the virtual chain but conflicts with another block on the virtual chain, then the virtual witness may recognize that it had been on a minority fork and take appropriate measures (244, 246) to transition off the minority fork, by replace the conflicting block with the data in the validation command and the local blockchain is marked globally valid up to the block referenced by the data in the validation command. When the consensus block is on the virtual chain and correctly references a block on the virtual chain without conflict, the local blockchain state is marked globally valid up to the block referenced by the consensus block.

FIGS. 5A-5C above generally illustrate an example of a single shared virtual blockchain that is validated using N satellites, where a user can consider a consistent copy of the virtual blockchain to be valid up to and including the most recent block for which signatures from at least a majority of the N satellites have been observed (e.g., if there are five satellites, a consistent copy of the blockchain may be considered valid up to and including the most recent block for which signatures from at least three satellites have been observed). Users may submit data to the blockchain for later high assurance integrity verification with only optional disclosure of that data to other parties.

Furthermore, order of data insertion to the virtual blockchain is also preserved with high assurance. Example uses include cryptocurrency, but other uses include securing integrity of documents, relationships, personal identification data, etc., i.e., contexts that need not involve cryptocurrency.

Furthermore, as noted above, trust relationships need not be maintained among participants for the system to function properly, and this example use case can be implemented with RSA, ECDSA, lattice-based, or other suitable signatures and/or hash-based signature schemes such as the Timed Efficient Stream Loss-tolerant Authentication (TESLA) broadcast authentication protocol in place of or in securely redundant combination with conventional signature functionality for enhanced long-term protection against future quantum or classical cryptanalytic advances, or may use other classical or quantum techniques that have been invented or might be invented in the future.

An exemplary set of parameters for a satellite to possess in order to meet data integrity design constraints and, subsequently, for configuring the satellite for participation in a blockchain system is disclosed herein. For example, prior to launch, each owner may design a satellite in an open manner amenable to skeptical public scrutiny by the security research community and any other interested parties. The system may be built on the principle that hardware designs and software code alike is openly shared, and bug bounty programs may be executed to motivate discovery and disclosure of remotely exploitable vulnerabilities prior to build and launch. This openness may further motivate discovery and disclosure of inadvertent owner-facing backdoor characteristics (e.g., as related to auto-generated VSK entropy and confidentiality).

Other non-technical considerations may also apply such as avoiding or discouraging close financial relationships among competing owners participating in the system and competing owners may also be situated to (ideally) avoid majority co-location within a single country or within a single jurisdiction as an additional mechanism to thwart design-time conspiracy among a majority subset (or even the perception thereof).

Owners and participating vendors may also run warrant programs (where allowed and appropriate), until after the system has entered production mode operation, or even indefinitely. Accordingly, a given owner may manufacture a satellite based upon the agreed-upon norms and configure the satellite specific random data string for CSK generation. At that point, the owner preserves confidentiality of the random data string to avoid the potential loss of future satellite availability and/or CSK rents.

Described in FIGS. 4A-4D and FIGS. 5A-5C were the various processes executed on from the perspective of a satellite or virtual witness participating in the system. However, as noted therein, the system also includes various Earth-side (or other space-based) participant systems, e.g. user systems 18, committer systems 16, and observer systems 19 that participate in some of the features described in FIGS. 4A-4D.

As such, an Earth-side (or other space-based) protocol may be implemented in conjunction with the satellite-side protocol (protocol 0) set forth in FIGS. 4A-4D, and the protocol 1 set forth in FIGS. 5A-5C, wherein the Earth-side (or other space-based) protocol may give committers primary responsibility to maintain smooth operation because committers are the ones who virtual witnesses most directly penalize (via protocol 1 CSK revocation) when operation does not proceed as expected. In particular, smooth operation is generally assured by maintaining mutual consensus among all committers on order and content of new blocks and by regularly supplying appropriate protocol 1 validation commands to the respective protocol 0 satellites. The simplest way to achieve this objective may be to simply take turns. Satellite owners, however, have ultimate control over system access (through issuance of protocol 0 and protocol 1 CSKs) as well as ultimate stake in system availability, and the owners may be positioned to play a lead role in equitably allocating system access among committers.

One approach to consensus is an elaboration of just taking turns. To be more equitable, committers who share a satellite could take turns creating blocks, but only for those blocks where it is their satellite's 'turn'. For example, if the system includes S satellites numbered 0 through (S-1), and $C_x$ committers for the satellite numbered $x \in [0, S-1]$, and where the committers for satellite x are numbered 0 through $C_{x-1}$, then the committer numbered $y \in [0, C_{x-1}]$ may have the exclusive right to generate protocol 1 block number N if N % S=x and (N/S) % $C_x$=y, where "/" means integer division and "%" means "integer remainder." Upon generating block N, committer y may post the protocol 1 block to some communal forum (e.g., on the Internet) for all other committers to see. At least one committer per satellite transmits protocol 1 block N in an appropriate format that enables their respective satellites to add protocol 1 block N "add new block" command to the respective protocol 0 chain and the committer posts their satellite's VSK signature on this back to the communal forum (e.g., for subsequent communal use in constructing protocol 1 validation commands indicating consensus with regard to block N). For each satellite, this may be the primary responsibility of the next committer in line to generate a protocol 1 block (of those committers for that particular satellite) or committer y in the special case of satellite x.

Validation commands processed as shown in FIG. 5C may follow an identical or similar strategy as commit commands used to add new blocks, as shown in FIG. 5B. However, the Earth-side protocol for validation commands may follow a two-block lag. If a committer becomes unresponsive when it is their turn, then after waiting a prearranged time interval (e.g., one hour), the other committers may reach an agreement that the prearranged time interval has elapsed and allow the next committer in line to have a double turn to restore responsiveness to the system. Refinements of this process could also account for geographical location of various committer system in relation to satellite trajectory, assuming any trajectory other than geostationary. In any case, the details of the Earth-side (or space-based) protocol should not affect protocol 1 chain integrity, but rather only affect efficiency and equitable operation. Protocol 1 Chain integrity should be ensured by the action of the virtual witnesses, which preserve robust integrity against a malicious participant.

The example use case described above in context with FIGS. 4A-4D is intentionally minimalist on the satellite side of the protocol, leaving substantial responsibility on the Earth side of the protocol for a generic blockchain use case. For example, satellite-side minimalism may advantageously reduce the risk of unfixable security vulnerabilities not being discovered until after launch while also offering a solution with improved functional generality.

In this illustrative example, virtual witness majority collectively attests to the absence of virtual blockchain forking and revision, and incentivizes individual Earth-side participants to maintain consensus with the majority. In the event of minority forks, the minority virtual witnesses can be brought back to the majority chain by furnishing proof of majority.

Conversely, minimalism may be even further increased by making each satellite responsible only for signing data that the satellite is asked to sign, along with a timestamp. From this, Earth-side protocols could knit together time-stamps from multiple satellites into a fork-resistant blockchain or similar structures. Although the example use case in FIGS. 5A-5C is illustrated and described from the perspective of a virtual witness participating in the system, as noted above, this example use case is further minimalist on the satellite side and delegates additional particulars to the Earth-side protocol.

As such, an Earth-side protocol may be implemented in conjunction with the satellite-side protocol set forth in FIG. 4A-4C, wherein the Earth-side protocol may be designed to be flexible and permit the ability to evolve over time as consensus permits.

For example, because chain initialization commands can create new chains on each satellite, multiple Earth-side protocols can run concurrently without the details of one such protocol impacting the specifics of other such protocols. The situation is thus more analogous to the governance of existing blockchain protocols, in that no extraterrestrial constraints are imposed. Nonetheless, the satellites obviate the need for Proof of Work or analogous mechanisms, which may permit the selection of participant satellites to change over time as new satellites are launched, old satellites are retired, etc.

For example, according to various embodiments, a first Earth-side protocol that can be implemented in conjunction with the use case illustrated in FIG. 4A-4C may simply treat each satellite as being a constellation of one (1). The blockchains of interest to user applications are then simply the blockchains of that satellite, and their latest state is simply the state as confirmed directly by CSCs that the satellite transmits to Earth. Users can then be as confident in the tamper-resistance of these chains as the continued secrecy of the VSKs. The remoteness of the satellites can maintain an assurance that increases (rather than decreases) over time, and is in any event no less than user confidence that satellite design and construction was neither malicious nor incompetent.

According to various embodiments, another Earth-side protocol may conceptually synthesize blockchains from multiple satellites into "metachains" such that the assurance of integrity in the metachain can exceed the integrity assurance of any single satellite chain. This technique may be useful for improving assurance over time as additional companies, governments, or other suitable entities launch competing satellites, since corruption of a minority can then be revealed by consensus of the majority.

One advantage of separating protocols 0 and 1 is that, where Earth-side consensus so dictates, new satellites may be seamlessly added and other satellites may be retired over time. In particular, one could start with the first Earth-side protocol described above after launching the first satellite and then transition to the present Earth-side protocol as an increasing number of additional satellites are also launched. Owners may even compete based on the level of assurance furnished by their respective brand reputations, and based on the diligence applied to satellite design, construction, and analysis ceremonies, which may be substantially analogous to conventional key generation ceremonies.

Figure 6:
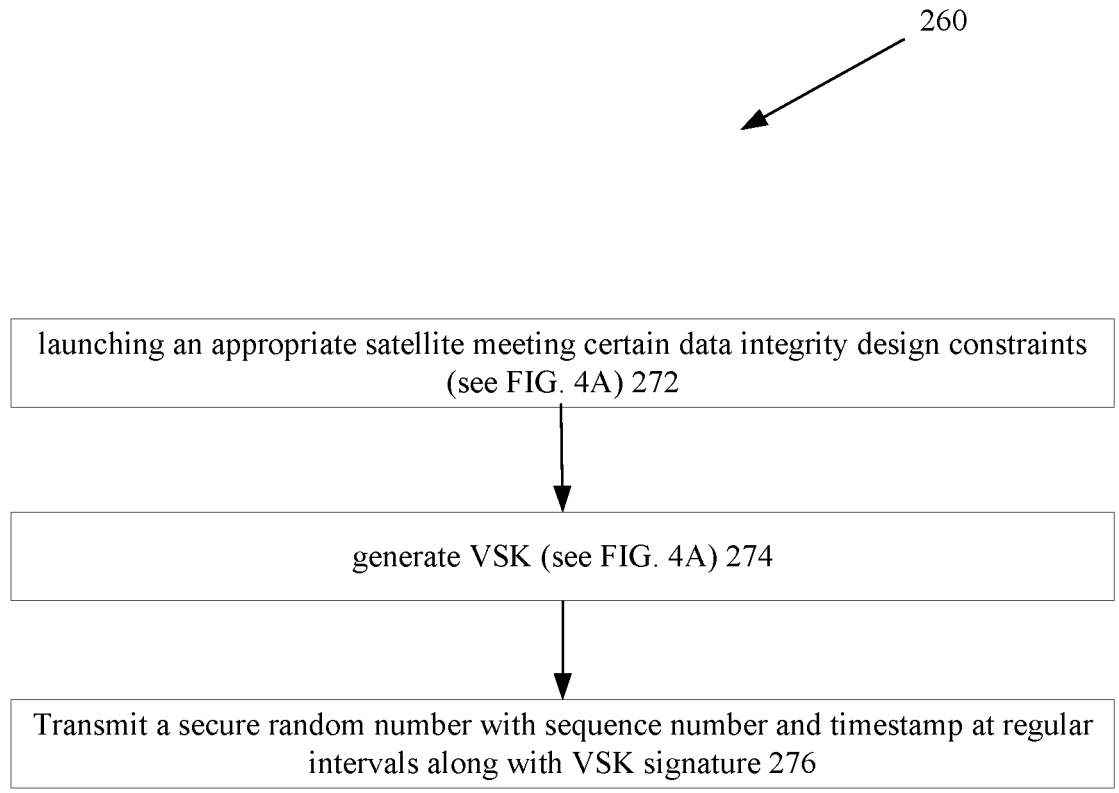
FIG. 6 is a flow diagram that depict processes for providing tamper-proof random numbers for terrestrial use in Proof of Stake protocols and other processes, which are carried out at spacecraft and/or other physically inaccessible platforms.

Referring now to FIG. 6, an exemplary process 280 is shown for operating spacecraft and/or other physically inaccessible platforms that permit Proof of Stake techniques to substantially replace Proof of Work techniques, e.g., in the context of cryptocurrencies, without incurring the liabilities that such a swap more typically implies. This is useful for other purposes as well, such as for lotteries or any other context requiring fair random selection. Since Proof of Work blockchains today provide public difficult-to-forge entropy as a sometimes useful side effect, FIG. 6 may be a useful complement to any implementation of FIGS. 4A-4D and/or 5A-5C.

For example, as described above, existing Proof-of-Stake algorithms generally function as a supplement to, rather than complete replacement of, Proof of Work, because the existing Proof-of Stake algorithms still require some incorruptible mechanism that may perform initial random selection from validators for production of a candidate block (or other manipulation-resistant block proposal mechanism). To overcome such drawbacks of existing algorithms, a non-corruptible random number generator having a publicly known output may be used, which non-corruptible random number generator avoids problems intrinsic to more easily manipulated block proposal mechanisms. Such a system may be useful for other purposes as well, such as non-corruptible lotteries.

As shown in FIG. 6, the process 270 illustrated therein includes launching 272 an appropriate satellite meeting certain data integrity design constraints (substantially similar as described in FIG. 4A. In this instance, the launched satellite has the data processing node 20 that includes the non-corruptible, i.e., incorruptible, random number generator. The data processing node 20 generates 274 a VSK in substantially the same manner as described above with respect to FIG. 4A.

The data processing node 20 causes the satellite to transmit a random number back to Earth with a sequence number at regular intervals 276. The data (including sequence number and timestamp) are signed by the satellite-specific VSK. If only one satellite is participating in the system, then user systems may use the random number for the desired public unbiased selection. If more than one satellite is operating in the system, then user systems may perform a "bitwise exclusive or" (XOR) on outputs of all participating satellites such that the effective entropy is no less than the largest entropy produced by the satellite that yields the most entropy.

Unlike the other example use cases described herein, corruption of a majority of participating satellites is not sufficient to corrupt the overall use case. In particular, the output of the XOR can be considered securely random unless every participating satellite has been compromised.

Optionally, the VSKs could be periodically regenerated and the old VSKs could expire, with the new VSKs transmitted to owners encrypted with a key known only to the owners. Such a mechanism may allow owners to charge for access to current VSKs and thus charge for use of the satellite-generated random numbers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources. An example of a data processing apparatus is the data processing node 20 of FIG. 2.

The term "data processing node" encompasses all kinds of apparatus, devices, and machines for processing data, including by way of example: a programmable processor, a computer, a system on a chip, or multiple ones, or combinations, of the foregoing. The apparatus can include special purpose logic circuitry, (e.g., an FPGA (field programmable gate array) or an ASIC (application specific integrated circuit)). The apparatus can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The apparatus and execution environment can provide various different computing model infrastructures, such as web services, distributed computing and grid computing infrastructures.

Terrestrial systems such as the owner systems 14, committer systems 16, user systems 18 and observer systems 19 encompasses all kinds of apparatus, devices, and machines for processing data, including by way of example a computer system or a computer embedded in another device (e.g., a mobile telephone, a personal digital assistant (PDA)), etc.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both.

As shown in FIG. 7, the essential elements of a computer are a processor(s) for performing actions in accordance with instructions and one or more memory devices for storing instructions and data. Generally, a computer will also include, or be operatively coupled to I/O interfaces, network/communication subsystems, and one or more mass storage devices for storing data (e.g., magnetic, magneto optical disks, or optical disks).

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, discussed is the example of earth-based user systems, committer systems, and owner systems, yet in some implementations user systems and/or committer systems could be deployed platforms in outer space. In other implementations, a satellite that is supplying the described service(s), could simultaneously also be consuming the service(s), i.e., a satellite might implement both a virtual witness platform and a user system. Therefore, the likely common example of terrestrial users and committers should not be construed to limit the scope of the claims unless explicitly stated as such in the claims that follow.

What is claimed is:

1. A method, comprises
configuring a data processing node for securing blockchains with a module that generates a verification signing key (VSK) pair when the data processing node is deployed to a physically inaccessible location, wherein the data processing node is contained in a spacecraft, the physically inaccessible location is a trajectory in outer space and the VSK pair includes a private VSK key that is known only to the data processing node and a public VSK key;
receiving by the data processing node, an indication of the deployment to the physically inaccessible location;
generating by the data processing node in response to the received indication, the verification signing key (VSK) pair and maintaining VSK integrity assurance subsequent to receiving the indication by transmitting a post-deployment VSK-signed timestamp as proof that the VSK pair was not prematurely generated; and
transmitting from the data processing node the public VSK key to one or more terrestrial electronic devices, wherein the blockchains are secured using the VSK pair.

2. The method of claim 1 wherein the data processing node is deployed to a physically inaccessible location, and the method further comprises:
causing by the data processing node signing of information transmitted to and/or from the one or more terrestrial electronic devices using the private VSK.

3. The method of claim 2 wherein one or more terrestrial nodes are configured to use the public VSK to verify integrity of the signed information.

4. The method of claim 1 further comprising:
receiving from one or more secure, true random number generators, a random number; and
generating the VSK pair using the received random number.

5. The method of claim 1 wherein transmitting the public VSK to the one or more terrestrial electronic devices occurs at periodic intervals.

6. The method of claim 1 wherein the spacecraft includes an indicator module, and the method further comprises: generating by the indicator module the indicator signal that is acted upon by the data processing node when the spacecraft is deploying to the physically inaccessible location.

7. The method of claim 6 wherein the indicator module sends the indicator signal to the data processing node when the spacecraft is at the physically inaccessible location.

8. The method of claim 1 further comprising:
receiving by the data processing node, a post-launch configuration command that indicates that post-launch configuration phase is complete;
triggering a one-time mechanism to permanently disable post-launch configuration commands and enable production mode operation; and
sending a notification to indicate that setup commands have been permanently disabled.

9. A method comprises:
obtaining a data processing node for securing blockchains, wherein the data processing node is contained in a spacecraft which is deployed to a physically inaccessible location that is a trajectory in outer space; and
configuring, the data processing node for securing blockchains with a module that causes the data processing node upon deployment to the physically inaccessible location to:
receive a deployment indicator signal from a deployment indicator;
generate in response to receipt of the deployment indicator signal, a verification signing key (VSK) pair that includes a private VSK key known only to the data processing node and a public VSK key, wherein VSK integrity assurance is maintained subsequent to receipt of the deployment indicator signal by transmitting a post-deployment VSK-signed timestamp as proof that that the VSK pair was not prematurely generated; and
transmit from the data processing node the public VSK key to one or more terrestrial electronic devices, wherein the blockchains are secured using the VSK pair.

10. The method of claim 9, further comprising:
configuring the data processing node to receive the deployment indicator signal upon deployment of the spacecraft.

11. The method of claim 10, further comprises:
configuring the spacecraft to generate the deployment indicator signal upon deployment to the physically inaccessible location comprises when the spacecraft is at the physically inaccessible location or just prior to launch of the spacecraft to the physically inaccessible location.

12. A vehicle comprising a spacecraft deployed to a physically inaccessible location, the vehicle comprising:
a data processing node for securing blockchains, wherein the data processing node is contained in the spacecraft and the physically inaccessible location is a trajectory in outer space, wherein the data processing node further comprises:
one or more processor devices;
memory operatively coupled to the one or more processor devices; and
storage media that stores a computer program comprising instructions to:
generate a verification signing key (VSK) pair that includes a private VSK key known only to the data processing node and a public VSK key upon receiving an indication of deployment of the vehicle the physically inaccessible location, wherein VSK integrity assurance is maintained subsequent to receiving the indication of deployment by transmitting a post-deployment VSK-signed timestamp to a receiver station as proof that the VSK pair was not prematurely generated; and
transmit from the data processing node subsequent to generation of the VSK pair, the public VSK key to one or more terrestrial electronic devices, wherein the blockchains are secured using the VSK pair.

13. The vehicle of claim 12, further comprises:
a deployment indicator that produces a deployment indication signal that is used to trigger the computer program to generate the VSK pair.

14. The vehicle of claim 12, further comprising instructions to:
cause the data processing node to sign information transmitted to/from the one or more terrestrial electronic devices using the private key.

15. The vehicle of claim 12, further comprising:
one or more secure, true random number generators to generate a random number for generating the VSK pair.

16. The vehicle of claim 12 wherein the vehicle is a spacecraft and the data processing node is contained in the spacecraft, and the instructions to transmit the public key, transmits the public key to the one or more terrestrial electronic devices at one or more periodic intervals.

17. The vehicle of claim 12, further comprising instructions to:
receive a post-launch configuration command that indicates that a post-launch configuration phase is complete;

trigger a one-time mechanism to permanently disable post-launch setup configuration commands and enable production mode operation; and send a notification to indicate that setup configuration commands have been permanently disabled.

18. A data processing node for securing blockchains, wherein the data processing node is contained in a spacecraft and comprises:

one or more processor devices;

memory operatively coupled to the one or more processor devices;

a deployment indicator that generates a deployment indicator signal upon deployment of the data processing node to a physically inaccessible location, where the physically inaccessible location is a trajectory in outer space; and storage media that stores a computer program that comprises instructions to cause the one or more processors to:

generate upon receiving the deployment indicator signal, a verification signing key (VSK) pair that includes a private VSK key known only to the data processing node and a public VSK key, wherein VSK integrity assurance is maintained subsequent to receiving the deployment indicator signal by transmitting a post-deployment VSK-signed timestamp to a receiver station as proof that the VSK pair was not prematurely generated; and transmit from the data processing node the public VSK key to one or more terrestrial electronic devices, wherein the blockchains are secured using the VSK pair.

19. The data processing node of claim 18 wherein the physically inaccessible location is a physical inaccessible location in outer space, and the data processing node further comprises:

a deployment indicator that generates a deployment indication signal to cause the one or more processors to generate the VSK pair.

20. The data processing node of claim 19 wherein the computer program generates the VSK in response to the deployment indicator signal.

21. The data processing node of claim 18, further comprising instructions to:

cause the data processing node to sign information transmitted to/from the one or more terrestrial electronic devices using the private key.

22. The data processing node of claim 18, further comprising:

one or more secure, true random number generators to generate a random number for generating the VSK pair.

23. The data processing node of claim 18, further comprising instructions to:

receive a post-deployment configuration command that indicates that post-deployment configuration phase is complete;

trigger a one-time mechanism to permanently disable post-deployment setup configuration commands and to enable production mode operation; and send a notification to indicate that setup configuration commands have been permanently disabled.

24. A computer program product tangibly stored on a non-transitory computer readable medium for configuring a data processing node contained in a spacecraft, wherein that when the data processing node is deployed to a physical location to generate a verification signing key (VSK) pair, the computer program product comprises instructions to cause the data processing node to:

secure blockchains and configure a module within the spacecraft to generate a verification signing key (VSK) pair, the VSK pair including a private VSK key known only to the data processing node and a public VSK key;

receive an indication of a deployment to the physical location, wherein the physical location is a trajectory in outer space;

generate by the module in response to receipt of the indication, the verification signing key (VSK) pair, wherein VSK integrity assurance is maintained subsequent to receiving the deployment indicator signal by transmitting a post-deployment VSK-signed timestamp to a receiver station as proof that the VSK pair was not prematurely generated; and transmit the public VSK key to one or more terrestrial electronic devices, wherein the blockchains are secured using the VSK pair.

25. The computer program product of claim 24, wherein the computer program product further comprises instructions to:

cause the data processing node to sign information transmitted to/from the one or more terrestrial electronic devices using the private key.

26. The computer program product of claim 24, further comprising instructions to:

receive from one or more secure, true random number generators a random number for generating the VSK pair.

27. The data processing node of claim 18, further comprising instructions to:

receive a post-deployment configuration command that indicates that post-deployment configuration phase is complete;

trigger a one-time mechanism to permanently disable post-deployment configuration commands and to enable production mode operation; and send a notification to indicate that setup commands have been permanently disabled.

* * * * *